US012725095B2

(12) United States Patent
Bhat et al.

(10) Patent No.: US 12,725,095 B2
(45) Date of Patent: Sep. 1, 2026

(54) SECURE RETRIEVAL-AUGMENTED GENERATION USING CHUNK-LEVEL VECTOR FILTERING AND VALIDATION

(71) Applicant: Citibank, N.A., New York, NY (US)

(72) Inventors: Ganesh Prasad Bhat, Jersey City, NJ (US); Joshua Adam Goldman, Merrick, NY (US); Venkata Uttam Kumar Chunduri, Jersey City, NJ (US); Vishal Mysore, Mississauga (CA); Ramkumar Ayyadurai, Jersey City, NJ (US); Chamindra Desilva, London (GB)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/207,360

(22) Filed: May 14, 2025

(65) Prior Publication Data

US 2026/0087417 A1 Mar. 26, 2026

Related U.S. Application Data

(60) Continuation-in-part of application No. 19/015,646, filed on Jan. 10, 2025, now Pat. No. 12,361,334, (Continued)

(51) Int. Cl.
*G06N 20/20* (2019.01)

(52) U.S. Cl.
CPC .................................... *G06N 20/20* (2019.01)

(58) Field of Classification Search
None
See application file for complete search history.

(56) References Cited

U.S. PATENT DOCUMENTS

| | | | |
|---|---|---|---|
| 9,842,045 | B2 | 12/2017 | Heorhiadi et al. |
| 10,324,827 | B2 | 6/2019 | Narayanan et al. |

(Continued)

FOREIGN PATENT DOCUMENTS

| | | | |
|---|---|---|---|
| CN | 106502890 A | | 3/2017 |
| WO | 2022125803 A1 | | 6/2022 |
| WO | 2024020416 A1 | | 1/2024 |

OTHER PUBLICATIONS

Lewis et al., Retrieval-Augmented Generation for Knowledge-Intensive NLP Tasks, arXiv:2005.11401v4 [cs.CL] Apr. 12, 2021; Total pp. 19 (Year: 2021).*

(Continued)

*Primary Examiner* — Alan Chen
(74) *Attorney, Agent, or Firm* — Perkins Coie LLP

(57) ABSTRACT

The systems and methods disclosed herein generate responses using data retrieved in accordance with chunk-level access controls. An output generation request is received via a computing device and includes (1) an input with instructions to generate an output and (2) an access control metadata set indicating the degree of access to a content set within a vector database for the user associated with the request. A vector representation set of data chunks that are associated with generating the output is selected by comparing the vector representation of the input with corresponding vector representations of data chunks in the content set. Using a first artificial intelligence (AI) model set, the data chunk set is filtered to generate a subset in accordance with the access control metadata set. A second AI model set (same or different) is used to generate a response to the input based on the data chunk subset.

20 Claims, 20 Drawing Sheets

Related U.S. Application Data which is a division of application No. 18/653,858, filed on May 2, 2024, now Pat. No. 12,198,030, which is a continuation-in-part of application No. 18/637,362, filed on Apr. 16, 2024, now Pat. No. 12,111,754.

(56) References Cited

U.S. PATENT DOCUMENTS

| | | | |
|---|---|---|---|
| 10,949,337 | B1 | 3/2021 | Yalla et al. |
| 11,106,801 | B1 | 8/2021 | Levine et al. |
| 11,227,047 | B1 | 1/2022 | Vashisht et al. |
| 11,449,798 | B2 | 9/2022 | Olgiati et al. |
| 11,573,848 | B2 | 2/2023 | Linck et al. |
| 11,636,027 | B2 | 4/2023 | Sloane |
| 11,652,839 | B1 | 5/2023 | Aloisio et al. |
| 11,656,852 | B2 | 5/2023 | Mazurskiy |
| 11,681,811 | B1 | 6/2023 | Dixit |
| 11,683,333 | B1 | 6/2023 | Dominessy et al. |
| 11,750,717 | B2 | 9/2023 | Walsh et al. |
| 11,875,123 | B1 | 1/2024 | Ben David et al. |
| 11,875,130 | B1 | 1/2024 | Bosnjakovic et al. |
| 11,924,027 | B1 | 3/2024 | Mysore et al. |
| 11,947,435 | B2 | 4/2024 | Boulineau et al. |
| 11,960,386 | B2 | 4/2024 | Indani et al. |
| 11,960,515 | B1 | 4/2024 | Pallakonda et al. |
| 11,983,806 | B1 | 5/2024 | Ramesh et al. |
| 11,990,139 | B1 | 5/2024 | Sandrew |
| 11,995,412 | B1 | 5/2024 | Mishra |
| 12,001,463 | B1 | 6/2024 | Pallakonda et al. |
| 12,026,599 | B1 | 7/2024 | Lewis et al. |
| 2017/0262164 | A1 | 9/2017 | Jain et al. |
| 2018/0089252 | A1 | 3/2018 | Long et al. |
| 2018/0095866 | A1 | 4/2018 | Narayanan et al. |
| 2019/0079854 | A1 | 3/2019 | Lassance Oliveira E Silva et al. |
| 2020/0043164 | A1 | 2/2020 | Fuchs et al. |
| 2020/0334326 | A1 | 10/2020 | Zhang et al. |
| 2021/0012486 | A1 | 1/2021 | Huang et al. |
| 2021/0097433 | A1 | 4/2021 | Olgiati et al. |
| 2022/0114399 | A1 | 4/2022 | Castiglione et al. |
| 2022/0179906 | A1 | 6/2022 | Desai et al. |
| 2022/0198304 | A1 | 6/2022 | Szczepanik et al. |
| 2022/0311681 | A1 | 9/2022 | Palladino et al. |
| 2022/0318654 | A1 | 10/2022 | Lin et al. |
| 2022/0358023 | A1 | 11/2022 | Moser et al. |
| 2022/0366140 | A1 | 11/2022 | Saito et al. |
| 2023/0009999 | A1 | 1/2023 | Higuchi et al. |
| 2023/0019072 | A1 | 1/2023 | Okunlola |
| 2023/0028339 | A1 | 1/2023 | Sloane |
| 2023/0033317 | A1 | 2/2023 | Lin et al. |
| 2023/0039855 | A1 | 2/2023 | Greene |
| 2023/0076795 | A1 | 3/2023 | Indani et al. |
| 2023/0113621 | A1 | 4/2023 | Griffin et al. |
| 2023/0164158 | A1 | 5/2023 | Fellows et al. |
| 2023/0171282 | A1 | 6/2023 | Bollinger |
| 2023/0177441 | A1 | 6/2023 | Durvasula et al. |
| 2023/0177613 | A1 | 6/2023 | Crabtree et al. |
| 2023/0252393 | A1 | 8/2023 | Orzechowski et al. |
| 2023/0269272 | A1 | 8/2023 | Dambrot et al. |
| 2023/0359789 | A1 | 11/2023 | Andre et al. |
| 2024/0020538 | A1 | 1/2024 | Socher et al. |
| 2024/0095077 | A1 | 3/2024 | Singh et al. |
| 2024/0129345 | A1 | 4/2024 | Kassam et al. |
| 2024/0144082 | A1 | 5/2024 | Tarapov et al. |
| 2024/0202442 | A1 | 6/2024 | Saito et al. |
| 2024/0256582 | A1* | 8/2024 | Jain .................... G06F 16/3329 |
| 2024/0346283 | A1 | 10/2024 | Ayachitula et al. |
| 2024/0370476 | A1 | 11/2024 | Madisetti et al. |

OTHER PUBLICATIONS

Jin et al., Curator: Efficient Indexing for Multi-Tenant Vector Databases; arXiv:2401.07119v1 [cs.DB] Jan. 13, 2024; Total pp. 14 (Year: 2024).*

AI Risk Management Framework Nist, retrieved on Jun. 17, 2024, https://www.nist.gov/itl/ai-risk-management-framework.

Empower Your Team with a Compliance Co-Pilot, Sedric, retrieved on Sep. 25, 2024. https://www.sedric.ai/.

Independent analysis of AI language models and API providers. Artificial Analysis, retrieved on Jun. 13, 2024, https://artificialanalysis.ai/, 11 pages.

What is AI Verify?, AL Verify Foundation, Jun. 11, 2024, 3 pages, https://aiverifyfoundation.sg/.

Aka et al., Measuring Model Biases in the Absence of Ground Truth, AIES '21, May 19-21, 2021, Virtual Event, USA .; pp. 327-335 (Year: 2021).

Brown, D., et al., "The Great AI Challenge: We Test Five Top Bots on Useful, Everyday Skills," The Wall Street Journal, published May 25, 2024.

Cranium, Adopt & Accelerate AI Safely, retrieved on Nov. 7, 2024, from https://cranium.ai/.

Dong, Y., et al., "Building Guardrails for Large Language Models," https://ar5iv.labs.arxiv.org/html/2402.01822v1, published May 29, 2024, 20 pages.

Futurism, "Sam Altman Admits That OpenAI Doesn't Actually Understand How Its AI Works", Jun. 11, 2024, 4 pages, https://futurism.com/sam-altman-admits-openai-understand-ai.

Generative machine learning models; IPCCOM000272835D, Aug. 17, 2023. (Year: 2023).

Guldimann, P., et al. "COMPL-AI Framework: A Technical Interpretation and LLM Benchmarking Suite for the EU Artificial Intelligence Act," arXiv:2410.07959v1 [cs.CL] Oct. 10, 2024, 38 pages.

Hu, Q., J., et al., "Routerbench: A Benchmark for Multi-LLM Routing System," arXiv:2403.12031v2 [cs.LG] Mar. 28, 2024, 16 pages.

International Search Report and Written Opinion received in Application No. PCT/US24/47571, dated Dec. 9, 2024, 10 pages.

Kojima, Takeshi, et al. "Large Language Models are Zero-Shot Reasoners," 36th Conference on Neural Information Processing Systems (NeurIPS 2022), arXiv:2205.11916 [cs.CL], Jan. 29, 2023, 42 pages.

Lai et al., Towards a Science of Human—AI Decision Making: A Survey of Empirical Studies, arXiv:2112.11471v1 [cs.AI] Dec. 21, 2021; Total pp. 36 (Year: 2021).

Mathews, A. W., "What AI Can Do in Healthcare-and What It Should Never Do," The Wall Street Journal, published on Aug. 21, 2024, retrieved on Sep. 5, 2024 https://www.wsj.com.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024].

Peers, M., "What California AI Bill Could Mean," The Briefing, published and retrieved Aug. 30, 2024, 8 pages, https://www.theinformation.com/articles/what-california-ai-bill-could-mean.

Schick et al., Toolformer: Language Models Can Teach Themselves to Use Tools, 37th Conference on Neural Information Processing Systems (NeurIPS 2023); Total pp. 13 (Year: 2023).

Wei, Jason, et al. "Chain-of-Thought Prompting Elicits Reasoning in Large Language Models," 36th Conference on Neural Information Processing Systems (NeurIPS 2022), arXiv:2201.11903 [cs.CL], Jan. 10, 2023, 43 pages.

Yuan et al., R-Judge: Benchmarking Safety Risk Awareness for LLM Agents, arXiv:2401.10019v1 [cs.CL] Jan. 18, 2024; Total pp. 23 (Year: 2024).

Zhao, H., et al., "Explainability for Large Language Models: A Survey," https://arxiv.org/abs/2309.01029, Nov. 28, 2024, 38 pages.

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv./abs/2409.10102.

(56) References Cited

OTHER PUBLICATIONS

"Singapore launches Project Moonshot", a generative Artificial Intelligence testing toolkit to address LLM safety and security challenges, https://www.imda.gov.sg/resources/press-releases-factsheets-and-speeches/press-releases/2024/sg-launches-project-moonshot, May 31, 2024, 8 pages.
Aggarwal, Nitin , KPIs for gen AI: Why measuring your new AI is essential to its success, https://cloud.google.com/transform/kpis-for-gen-ai-why-measuring-your-new-ai-is-essential-to-its-success.
ANTHROP/C , Mapping the Mind of a Large Language Model, https://www.anthropic.com/research/mapping-mind-language-model, May 21, 2024.
Claburn, Thomas , OpenAI's GPT-4 can exploit real vulnerabilities by reading security advisories, The Register, https://www.theregister.com/2024/04/17/gpt4_can_exploit_real_vulnerabilities/?utm_source=tldrai, Apr. 17, 2024, 3 pages.
Marshall, Andrew , Threat Modeling Al/ML Systems and Dependencies, Nov. 2, 2022, 27 pages.
Roose, Kevin , "A.I. Has a Measurement Problem", The New York Times, Apr. 15, 2024, 5 pages.
Roose, Kevin , "A.I.'s Black Boxes Just Got a Little Less Mysterious", The New York Times, May 21, 2024, 5 pages.
Shah, Harshay , Decomposing and Editing Predictions by Modeling Model Computation, arXiv:2404.11534v1 [cs.LG] Apr. 17, 2024.
Shankar, Ram , "Failure Modes in Machine Learning", , Nov. 2019, 14 pages.

* cited by examiner

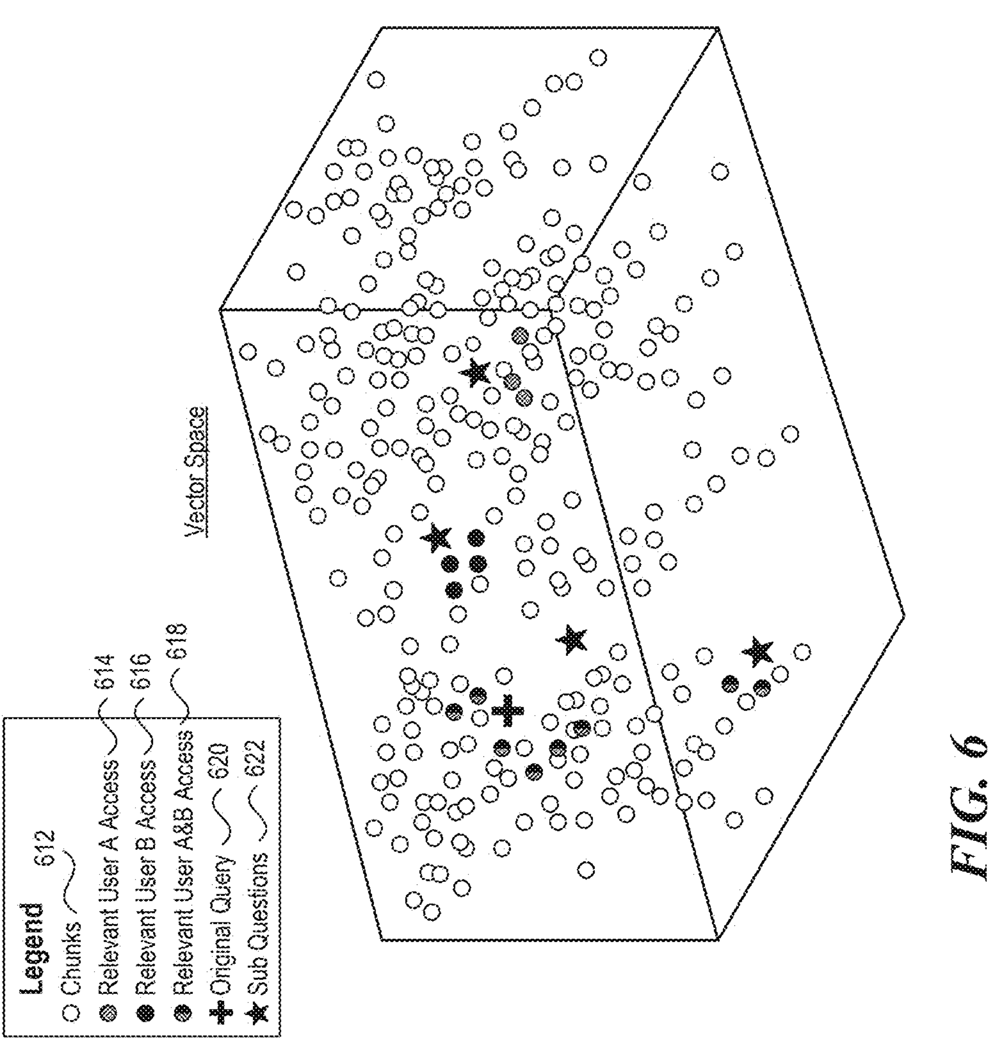
FIG. 6
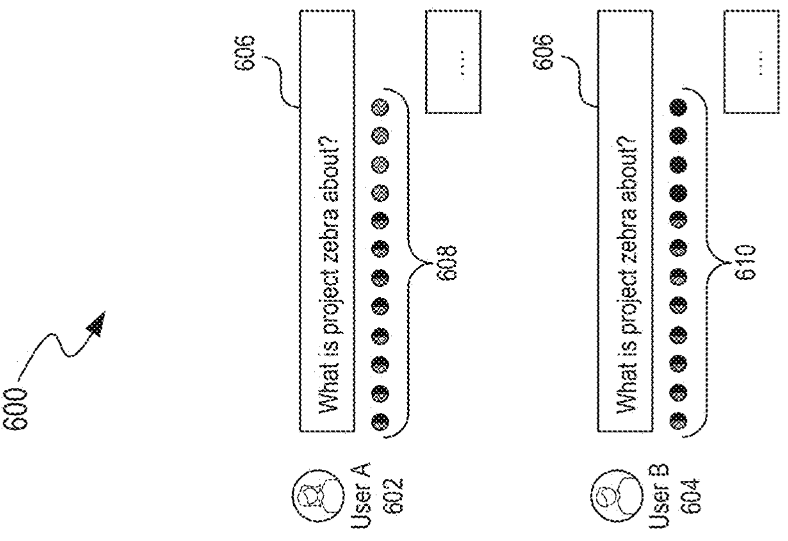

SECURE RETRIEVAL-AUGMENTED GENERATION USING CHUNK-LEVEL VECTOR FILTERING AND VALIDATION

CROSS-REFERENCE TO RELATED APPLICATION(S)

This application is a continuation-in-part of U.S. patent application Ser. No. 19/015,646 entitled "VALIDATING VECTOR CONSTRAINTS OF OUTPUTS GENERATED BY MACHINE LEARNING MODELS" and filed Jan. 10, 2025, which is a divisional of U.S. Pat. No. 12,198,030 entitled "VALIDATING VECTOR CONSTRAINTS OF OUTPUTS GENERATED BY MACHINE LEARNING MODELS" and filed May 2, 2024, which is a continuation-in-part of U.S. Pat. No. 12,111,754 entitled "DYNAMICALLY VALIDATING AI APPLICATIONS FOR COMPLIANCE" and filed Apr. 16, 2024.

BACKGROUND

Data retrieval refers to obtaining data from a database management system (DBMS), which can include databases such as relational databases (RDBMS), object-oriented databases (ODBMS), NoSQL databases, and so forth. In order to retrieve the desired data (typically represented as a vector embedding), the user presents a set of criteria by a query (e.g., to an AI model that is communicatively connected to the DBMS). A query language, such as Structured Query Language (SQL), can be used to prepare the queries to perform various operations including selecting, inserting, updating, and deleting data. The query includes criteria that define what data the user is interested in, such as specific columns from a table, data that meets certain conditions, or data that is sorted in a particular order. The DBMS searches through the data storage structures, filters the data based on the provided criteria, and retrieves the relevant data. The retrieved data can be stored in a file, printed, or viewed on the screen. However, the retrieved data is retrieved regardless of a validation status (e.g., whether the data satisfies an access level of a user, or whether the data has been sanitized). Fetching data without validation can result in poor data quality, and unauthorized users can gain access to sensitive or restricted data.

BRIEF DESCRIPTION OF THE DRAWINGS

FIG. 6 illustrates an example environment of filtering vector representations of content used by a data validation platform to generate responses in accordance with some implementations of the present technology.

Figure 1:
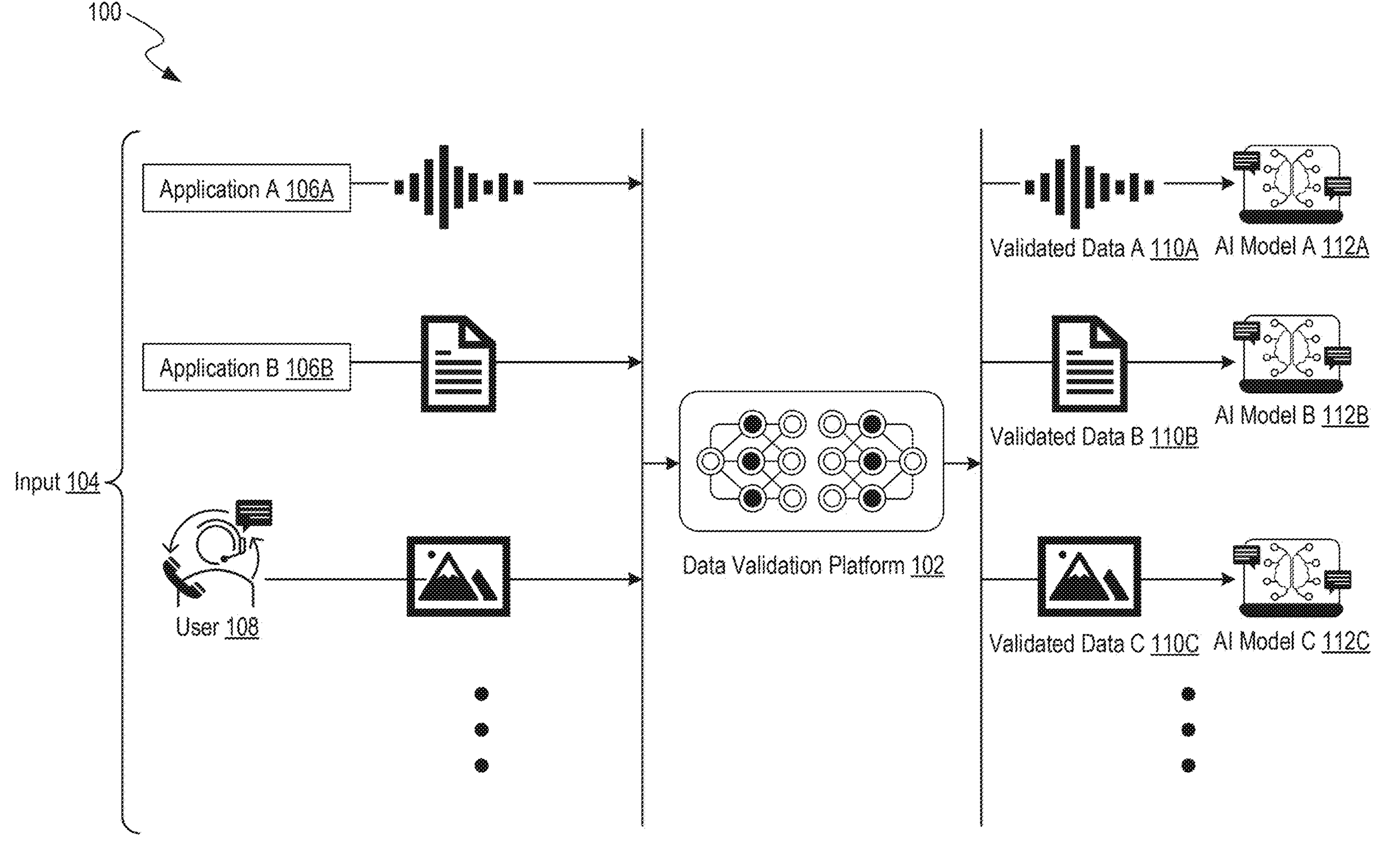
FIG. 1 illustrates an example environment of the data validation platform for data retrieval of artificial intelligence (AI) model(s) using hash signatures.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Vector embeddings are numerical representations of data items (e.g., data retrieved or AI model outputs), such as words, sentences, or documents, mapped to a continuous vector space. These embeddings capture the semantic relationships and contextual information of the items they represent, such that similar items are located close to each other in the vector space. The embedded vectors can be used to retrieve data in response to an incoming query or request. For example, similarity measures, such as cosine similarity or Euclidean distance, can be used to find and rank the stored vector embeddings that are most similar to the query vector. This enables the retrieval system to provide relevant and contextually appropriate results, such that even if the exact keywords are not matched, underlying semantic similarities represented in the embedded vectors can be used to locate the embedded vectors.

Conventional data retrieval of vector embeddings typically repeatedly revalidates data during the retrieval process. Each time data is accessed or queried, the conventional data retrieval systems validate the data (e.g., to ensure compliance, accuracy, relevance, permissions, and so forth), which significantly increases computational costs. The constant need for validation not only slows down workflows but also hinders the overall performance and responsiveness of the system. Moreover, conventional systems often lack validation checks to prevent and detect tampered or unvalidated content. The oversight can leave conventional systems susceptible to various security threats, including data breaches and the unauthorized manipulation of information. Further, as the volume of data grows, the complexity and frequency of validation processes typically increase. Conventionally, systems often struggle to keep up with these demands due to the need for extensive computational resources. This scalability issue makes it challenging to efficiently manage and retrieve embeddings from large, complex datasets, thereby limiting the system's ability to scale and handle increasing data loads effectively.

Not only do conventional data retrieval systems struggle with the repeated revalidation of data, but within a single validation, conventional data retrieval systems cannot selectively filter and retrieve data chunks according to user-specific access levels. As a result, when an AI model processes a query, it may inadvertently retrieve and expose data that the user is not authorized to access. The inability to enforce chunk-level access controls can lead to unauthorized access to sensitive (or otherwise protected or classified) information. Further, conventional data retrieval systems typically operate on a document-level basis, meaning that access permissions are usually granted or denied for entire documents rather than specific sections or chunks within those documents. Document-level based access can be problematic in scenarios where users need access to only certain parts of a document due to confidentiality or sensitivity concerns. For example, in a corporate environment, an employee can be permitted to view only certain sections of a legal document, but not the entire content. Thus, this leads to either over-exposure of sensitive information or overly restrictive access that hampers productivity.

Moreover, to accommodate access level controls, organizations may deploy multiple AI models, each tailored to different user permissions. Multiple AI models not only increase the computational overhead but also increase system resources used in the management and maintenance of these models. Alternatively, conventional systems may use post-retrieval filtering, where all data is initially retrieved, and unauthorized data is filtered out afterward. However, post-retrieval filtering not only processes and transfers large amounts of unnecessary data, which leads to increased latency and resource consumption, but also increases the risk of the user accessing the unauthorized data (e.g., an AI model using the unauthorized data in its response).

Attempting to create a system to validate data, such as retrieved data or AI model outputs, created significant technological uncertainty. Developing such a system required addressing several unknowns in conventional approaches to data validation, such as how to validate data chunks and/or enforce access-level controls while maintaining low latency. Conventional data validation systems, frequently repeat through redundant validations that are inapplicable and/or already validated. For example, the validation requirements can differ based on factors such as the specific guidelines for data integrity, the context in which the data is used, the particular processing needs implied by the data type, and so forth. Further, in conventional data validation systems, when even a small portion or chunk of a document changes, the entire document often is revalidated. As a result, the system treats the document as a whole and consumes significant computational resources and time, especially for large documents. This inefficiency becomes particularly problematic in dynamic environments where documents are frequently updated, thus necessitating constant and resource-intensive revalidation cycles.

To overcome these technological uncertainties, the inventors evaluated multiple design alternatives. For example, the inventors tested various validation techniques to ensure accurate and efficient data validation. One alternative tested included distributed validation methods, where each system processor independently handled a different validation of each document. However, this approach often led to redundant processing, with many validations still being duplicated across systems due to there being no indication whether a document has already been validated. Another design alternative was to evaluate breaking a document into chunks and validating each chunk independently. While this method reduced the amount of content validated at one time, it still required revalidating chunks even if only a small portion of the document changed, leading to inefficiencies and increased computational overhead. Additionally, the inventors considered validating data post-retrieval, where the system first retrieves the entire document and then performs validation. However, unauthorized data could already be retrieved before validation, which creates significant security risks and potentially exposing sensitive information to unauthorized users. This method also failed to prevent the retrieval of unvalidated or tampered data.

As such, the inventors have developed a system for validating data (e.g., AI model outputs or data retrieved during data retrieval) using artificial intelligence (AI) models (hereinafter the "data validation platform"). The data validation platform is enabled to generate responses using data retrieved by validating vector embeddings using hash signatures. In some implementations, when a user (e.g., a software application, an individual, an automated system) submits an output generation request via a computing device, the request can include an input that consists of a content set and a command set. The content set can include various types of data chunks, which can include text, audio, image, and/or video data. The command set can specify the actions or operations to be performed on the content set. In some implementations, the data chunks are of an output of one or more AI models.

The data validation platform can identify a subset of data chunks that do not have existing hash signatures. The hash signatures are unique identifiers that identify the validation status of the data chunks (e.g., validated, not validated). The data validation platform validates the selected data chunks against predefined constraints. The constraints define the operational boundaries of a set of guidelines, thus ensuring that the data chunk is validated before the data is retrieved (or after the AI model generates the output). Once a data chunk is validated, the platform assigns it a unique hash signature (e.g., a SHA-256 hash, a SHA-512 hash, and so forth). The hash signature indicates the degree to which the data chunk satisfies the predefined guidelines. In some implementations, using an AI model, the data validation platform generates a response to the output generation request using the validated data chunks.

By using hash signatures, the data validation platform ensures that data chunks that are validated are not subsequently re-validated. This approach eliminates the need for redundant validations, as the data validation platform solely validates data chunks that do not have existing hash signatures. The data validation platform significantly reduces computational overhead and improves system performance metrics, such as latency in data retrieval (e.g., the delay before a transfer of data begins following an instruction for its transfer). Each hash signature is a unique identifier that records the validation status and integrity of a data chunk at a specific point in time. This creates a verifiable trail of validation activities, enabling the tracking and auditing of data chunks throughout their lifecycle. In the event of a data integrity issue, auditors can trace back through the hash signatures to determine when and how each data chunk was validated, and by whom. Additionally, the immutable nature of hash signatures means that once a data chunk is validated and assigned a hash signature, the validation record can no longer be altered.

Further, the data validation platform is enabled to generate responses using data retrieved in accordance with chunk-level access controls. In some implementations, when a user submits an output generation request via a computing device, the request can include an input with instructions to generate an output, and an access control metadata set. The access control metadata set indicates the degree of access the user has to a content set within a vector database (e.g., a user role, a user access level, and so forth). In some implementations, the input is an output from an AI model. The data validation platform can select a vector representation set of data chunks to generate the requested output. For example, the data validation platform can compare the vector representation of the input with the corresponding vector representations of data chunks in the content set. The data validation platform uses a first set of artificial intelligence (AI) models to filter the data chunk set to generate a subset of data chunks that comply with the access control metadata set. Thus, only the data chunks the user is authorized to access are included in the subset. In some implementations, the data validation platform uses a second set of AI models (which can be the same as or different from the first set) to generate a response to the input. The response can be based on the filtered data chunk subset, thus ensuring that the output is both relevant and compliant with the user's access permissions.

By implementing chunk-level access controls, the data validation platform ensures that only authorized data chunks are accessed by the user, reducing the risk of unauthorized data exposure. Further, the data validation platform reduces the redundant processing that would occur if all data chunks (unauthorized or authorized) were first retrieved and then subsequently filtered, thereby lowering computational overhead and reducing latency in data retrieval. Additionally, the data validation platform is enabled to dynamically adjust to user-specific access permissions such that even when user-specific access permissions change, the data chunk's associated metadata can automatically reflect the updated authorization status.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed intent-based data validation platform can evaluate data using support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of Using the Data Validation Platform Based on Hash Signatures FIG. 1 illustrates an example environment 100 of the data validation platform 102 for data retrieval of artificial intelligence (AI) model(s) using hash signatures. Environment 100 includes input 104 to be input into the data validation platform 102, transmitted by applications 106 (e.g., first application 106A, second application 106B, and so forth) and/or users 108. The data validation platform 102 can output the validated data 110 (e.g., first validated data 110A, second validated data 110B, third validated data 110C) to be used in the AI models 112 (e.g., first AI model 112A, second AI model 112B, third AI model 112C). AI models 112 are the same as or similar to AI application 1802 illustrated and described in more detail with reference to FIG. 18. The environment 100 can be implemented using components of example computer system 1700 illustrated and described in more detail with reference to FIG. 17. Likewise, implementations of example environment 100 can include different and/or additional components or can be connected in different ways.

The input 104 refers to the data received or otherwise obtained by a computing device (e.g., provided by user 108 or applications 106), that can be in various modes such as text, audio, image, video and/or other multimodal content. The input 104 can include structured data from databases, unstructured data from documents, and so forth. For example, user input 104 can include a text document containing customer feedback, an audio recording of a customer service call, or an image of a handwritten note. Structured data can be in the form of tables or spreadsheets, while unstructured data can be free-form text or multimedia files. Applications 106 refer to the various software tools and modules that transmit the input 104 to the data validation platform 102. Each application can collect and transmit specific types of data from different sources to the data validation platform 102. In some implementations, applications 106 can include APIs (Application Programming Interfaces) that integrate external systems and data sources with the data validation platform 102. In some implementations, the input 104 can be data associated with an AI model that is configured to use the input 104 to generate a response. For instance, in a customer service application, the input 104 can include a document attached to the user's query.

The data validation platform 102 is configured to apply a set of predefined constraints, known as guardrails, to ensure that the input 104 complies with specified criteria such as bias, toxicity, Personally Identifiable Information (PII) checks, and so forth. If the input 104 complies with the predefined constraints, the data validation platform 102 generates unique hash signatures for each data chunk of the input 104, which can then be stored along with the data chunks in a database. Methods of applying the predefined constraints on the input 104 are discussed in further detail with reference to FIG. 2 and FIG. 3. A hash signature is a fixed-size string of characters generated by a hash function, which uniquely represents the content of the data chunk. The hash function intakes the input data and applies a series of mathematical operations to produce a unique output, known as the hash value or hash signature. In some implementations, the hash signature has a fixed length, regardless of the size of the input. The uniqueness of the hash signature ensures that even the slightest change in the input data will result in a completely different hash signature, also known as the "avalanche effect," where a small modification to the input produces a different output. For example, changing a single character in a text document or altering one pixel in an image can cause the data validation platform 102 to generate a new hash signature, thus enabling the data validation platform 102 to detect any alterations or tampering.

Validated data 110 refers to the output of the data validation platform 102, which has been evaluated and verified to meet the predefined constraints. The validated data 110 can be used by downstream AI models 112 to perform tasks such as predictions, classifications, recommendations, and so forth. The validated data 110 can include first validated data 110A, second validated data 110B, and third validated data 110C, each corresponding to the same or different types of data or validation criteria. Validated data 110 can, in some implementations, be associated with metadata that provides information such as the constraints applied, the timestamp, the hash signatures generated, and so forth.

Figure 2:
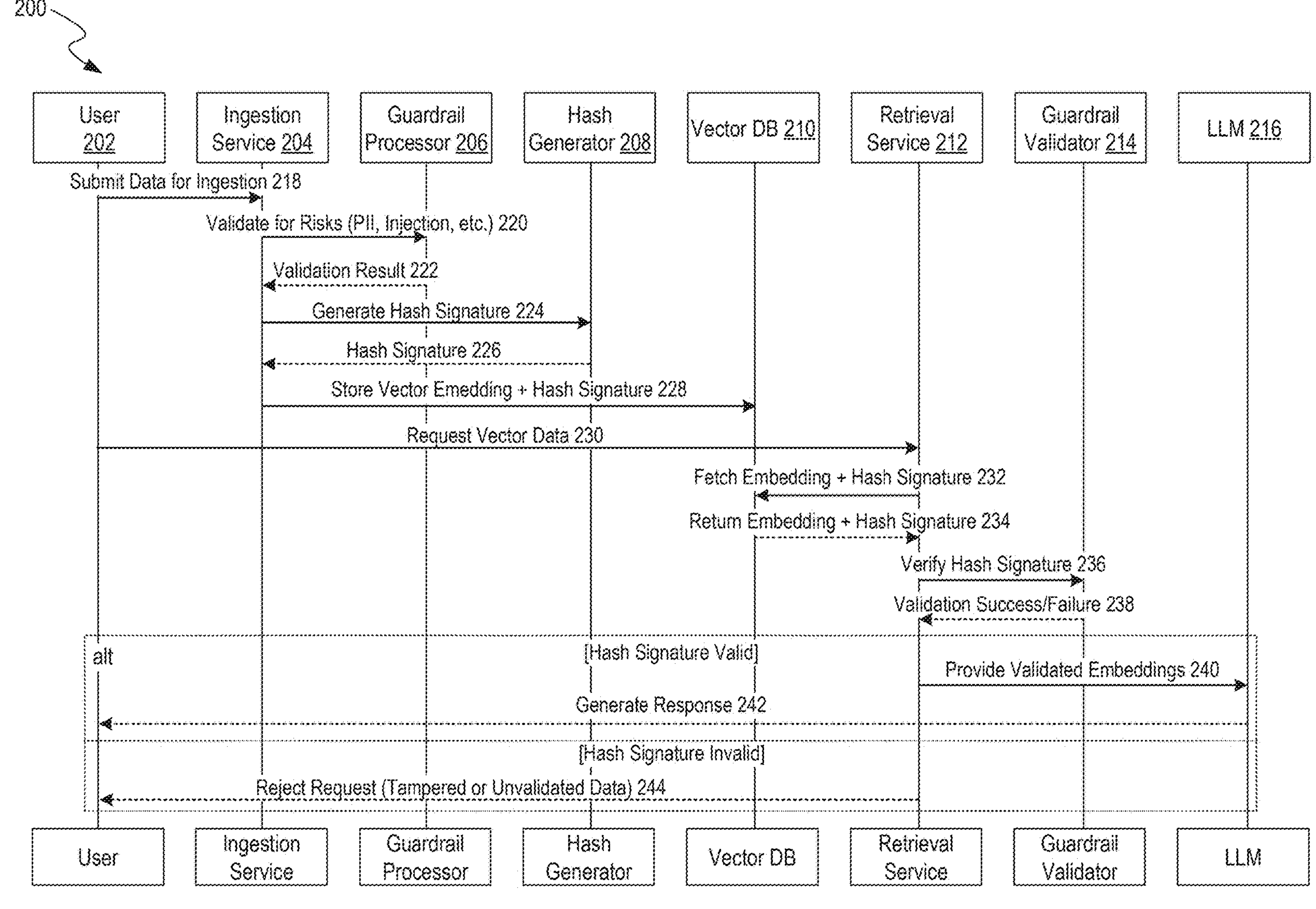
FIG. 2 illustrates an example environment of a data validation platform for validating vector embeddings using hash signatures in accordance with some implementations of the present technology.

FIG. 2 illustrates an example environment 200 of the data validation platform 102 of FIG. 1 for validating vector embeddings using hash signatures. Environment 200 includes a user 202, an ingestion service 204, a guardrail processor 206, a hash generator 208, vector database 210, a retrieval service 212, a guardrail validator 214, and an LLM 216. The guardrail processor 206 and LLM 216 are the same as or similar to AI application 1802 illustrated and described in more detail with reference to FIG. 18. The environment 200 can be implemented using components of example computer system 1700 illustrated and described in more detail with reference to FIG. 17. Likewise, implementations of example environment 200 can include different and/or additional components or can be connected in different ways.

In operation 218, the user 202 submits data for ingestion by the ingestion service 204. The user 202 can interact with a user interface (UI) provided by an application, such as a web portal, mobile app, or desktop software. The user 202 can upload various forms of data, including text files, audio recordings, images, or other multimodal content. The UI can include input fields, file upload buttons, and other interactive elements that enable the user 202 to select and submit the desired data. Once the user 202 selects the data and initiates the submission, the data can be transmitted over a network, such as the internet, to the ingestion service 204. The ingestion service 204 can refer to a software component or microservice designed to receive the data.

In operation 220, the ingestion service 204 validates the data for risks (e.g., PII, injection, and so forth) using the guardrail processor 206. The ingestion service 204 transmits the ingested data to the guardrail processor 206 to identify and remediate portions of the data that fail to satisfy guidelines (e.g., regulations). The guardrail processor 206 can validate the data using methods discussed with reference to FIGS. 7-18. In some implementations, the guardrail processor 206 can identify Personally Identifiable Information (PII). PII can refer to any data that directly or indirectly identifies a specific individual, such as names, addresses, phone numbers, social security numbers, and email addresses. The guardrail processor 206 can identify and match patterns within the data to identify PII.

In some implementations, the guardrail processor 206 can identify injection attacks. Injection attacks refer to malicious attempts to execute unauthorized commands or queries within a system, often by inserting harmful code into data inputs. Common types of injection attacks include SQL injection, where malicious SQL statements are inserted into database queries, and script injection, where harmful scripts are embedded in web forms. The guardrail processor 206 can, for example, sanitize the data by removing or escaping special or predefined characters that have a likelihood to be used to execute malicious commands. The guardrail processor 206 can evaluate the data to identify bias and toxicity (discussed with reference to FIGS. 7-18).

In operation 222, the guardrail processor 206 transmits the validation result 222 to the ingestion service 204. The validation result can be a report generated by the guardrail processor 206 that includes the compliance status of the data. The guardrail processor 206 can structure the validation result into a structured format, such as a JSON or XML document.

If the validation result indicates compliance of the data with a set of guidelines, in operation 224, the ingestion service 204 generates a unique hash signature for the data using the hash generator 208. The hash generator 208 is enabled to create a fixed-size string of characters, known as a hash signature, that uniquely represents the content of the data. The hash generator 208 applies a cryptographic hash function to the data. A cryptographic hash function can refer to a mathematical algorithm that takes an input (or "message") and returns a fixed-size string of bytes. The output, typically a hash value or hash signature, is unique to each unique input. In operation 226, the hash generator transmits a hash signature to the ingestion service 204. The ingestion service 204 associates the hash signature with the validated data. In operation 228, the ingestion service 204 stores a vector embedding of the data along with the generated hash signature in the vector database 210. A vector embedding can refer to a numerical representation of the data in a high-dimensional space. The ingestion service 204 can use one or more embedding models to convert the data into a vector embedding. For example, text data can be converted into a vector embedding using methods such as Word2Vec, GloVe, or BERT, which capture the semantic meaning of the text in a numerical format. Image data can be converted into a vector embedding using convolutional neural networks (CNNs), which capture the visual features of the image.

In operation 230, the user 202 requests the vectorized data from the retrieval service 212. The user 202 interacts with a user interface (UI) provided by an application, such as a web portal, mobile app, or desktop software, to submit a request for the vectorized data. The UI can include input fields, search bars, and/or other interactive elements that enable the user 202 to specify the criteria for the data request. The user 202 can provide various parameters, such as keywords, data types, or specific identifiers, to define the scope of the request. The retrieval service 212 can refer to a software application or microservice in communication with the UI and configured to receive the user requests.

In operation 232, the retrieval service 212 fetches the vector embedding of the data along with the generated hash signature from the vector database 210. The retrieval service 212 can construct a query based on the user's request parameters that includes an indication of the vector embedding. The retrieval service 212 executes the query against the vector database 210, which processes the query and identifies the vector embeddings that match the specified criteria. The vector database 210 retrieves the relevant vector embeddings and their associated hash signatures from the storage system. In operation 234, the vector database 210 returns the vector embedding of the data along with the generated hash signature to the retrieval service 212.

In operation 236, the retrieval service 212 verifies the hash signature with the guardrail validator 214. The guardrail validator 214 can, for example, use the same cryptographic hash function that was used to generate the original hash signature to compute a new hash signature for the retrieved data. The guardrail validator 214 compares the newly computed hash signature with the hash signature received from the retrieval service 212. If the two hash signatures match, it indicates that the data has not been tampered with or altered since the hash signature was originally generated. If the hash signatures do not match, it indicates that the data may have been tampered with or altered, and the guardrail validator 214 can flag the data as potentially compromised.

In operation 238, the guardrail validator 214 returns a validation indicator. The guardrail validator 214 generates a validation indicator based on the result of the hash signature verification. The validation indicator can be a status message, such as "success" or "failure," indicating whether the data passed the verification performed by the guardrail validator 214. In operation 240, if the hash signature is indicated as valid by the guardrail validator 214, the retrieval service 212 provides the validated embeddings to LLM 216. In operation 242, the LLM 216 generates the response using the validated embeddings. In operation 244, if the hash signature is indicated as not valid by the guardrail validator 214, the retrieval service 212 rejects the request of the user (e.g., in the case of tampered or unvalidated data).

Figure 3:
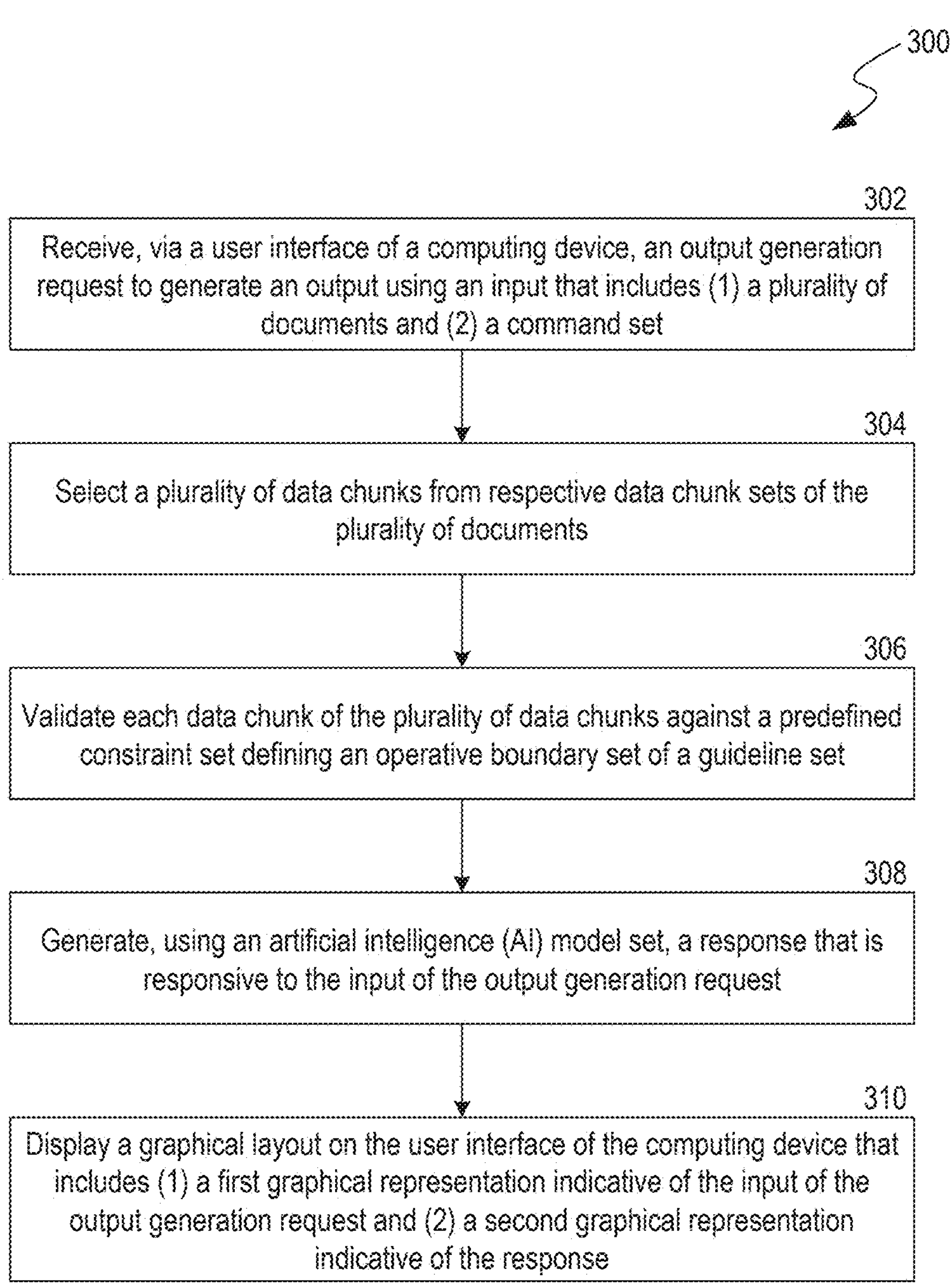
FIG. 3 is a flow diagram illustrating an example process of validating vector embeddings using a data validation platform using hash signatures in accordance with some implementations of the present technology.

FIG. 3 is a flow diagram illustrating an example process 300 of validating vector embeddings using the data validation platform 102 of FIG. 1 using hash signatures. In some implementations, the process 300 is performed by a computer system, e.g., example computer system 1700 illustrated and described in more detail with reference to FIG. 17. Implementations can include different and/or additional steps or can perform the steps in different orders.

In operation 302, the data validation platform 102 can receive (e.g., obtain), via a computing device (e.g., a user interface, an AI model set), an output generation request to generate an output using an input that includes (1) a plurality of documents and (2) a command set. The input can include unstructured data (e.g., text documents, emails, chat logs, images, voice recordings). Each document of the plurality of documents can include a data chunk set that includes text data, audio data, image data, and/or video data. The computing device can include a user interface that enables users to upload documents and specify commands, or can include an AI model set that automatically generates requests based on predefined criteria. The data validation platform 102 can partition received documents into the data chunks based on the command set, a predefined size, a dynamically determined size (e.g., number of sentences, number of paragraphs), and so forth.

In operation 304, the data validation platform 102 can select a data chunk subset from respective data chunk sets of the plurality of documents by determining that each data chunk of the data chunk subset fails to map to one or more respective hash signatures produced by applying one or more hash functions on the data chunk. The platform applies cryptographic hash functions to each data chunk to generate hash signatures. A hash function can refer to a mathematical algorithm that takes an input (or "message") and returns a fixed-size string of bytes. The output can be a hash value or hash signature, which is unique to each unique input. The data validation platform 102 can compare the generated hash signatures with existing hash signatures stored in a database. If a data chunk fails to map to any existing hash signature, the data chunk can be selected.

In operation 306, the data validation platform 102 can validate each data chunk of the data chunk subset against a predefined constraint set defining an operative boundary set of a guideline set. For example, the data validation platform 102 can identify a content set within one or more data chunks of the data chunk subset failing to satisfy the predefined constraint set. In some implementations, the data validation platform 102 can assign a confidence score to each data chunk that indicates a likelihood that the data chunk satisfies the predefined constraint set. The predefined constraint set can include rules and guidelines (e.g., for data quality, security, compliance, and so forth). The data validation platform 102 can assign a confidence score to each data chunk, indicating the likelihood that the data chunk satisfies the predefined constraints. The confidence score can be based on the results of the validation checks.

The data validation platform 102 can modify the content set to satisfy the predefined constraint set by applying a data mask, adding supplemental data, and/or removing a portion of the content set. The data validation platform 102 can assign a unique hash signature to the data chunk indicative of a degree of satisfaction of the data chunk with the guidelines. For example, the data validation platform 102 can apply a data mask to obfuscate sensitive information, add supplemental data to provide context or fill in missing information, remove portions of the content that fail to satisfy the constraints, and so forth. In some implementations, the corresponding unique hash signature assigned to each data chunk encodes a metadata set that indicates one or more constraints of the predefined constraint set satisfied by a corresponding content set of the data chunk. The hash signature can encode metadata that indicates the constraints satisfied by the data chunk. This metadata can include information such as the type of modification applied, the validation checks performed, and/or the confidence score.

In operation 308, the data validation platform 102 can generate, using an AI model set, a response that is responsive to the input of the output generation request. For example, the data validation platform 102 can transmit the respective data chunk sets of the plurality of documents to one or more input nodes of the AI model set. Each data chunk of the respective data chunk sets of the plurality of documents can be associated with a corresponding unique hash signature. The data validation platform 102 can receive, from one or more output nodes of the AI model set, the response. The response can include outputs such as text summaries, image classifications, or speech transcriptions. The data validation platform 102 can receive the response from one or more output nodes of the AI model set and package the response into a structured format, such as a JSON or XML document.

In operation 310, the data validation platform 102 can, responsive to generating the response, display a graphical layout on the user interface of the computing device that includes a first graphical representation indicative of the input of the output generation request, a second graphical representation indicative of the response, and/or a third graphical representation indicating one or more data chunks of the respective data chunk sets of the plurality of documents used to generate the response. For example, the first graphical representation can include elements such as text boxes, images, and audio players that display the input data. The second graphical representation can include elements such as charts, graphs, and tables that display the response. The third graphical representation can include elements such as highlights, annotations, and links that indicate the data chunks used to generate the response.

In some implementations, the data validation platform 102 can store the data chunk subset in a database configured to associate each data chunk of the data chunk subset with (1) the corresponding unique hash signature and (2) a set of metadata indicating the set of guidelines. The database can be a structured repository that stores the data chunks (e.g., vector representations of the data chunks), corresponding hash signatures, and/or associated metadata. The data validation platform 102 can include one or more APIs and interfaces to enable external systems and users to access the stored data.

Figure 4:
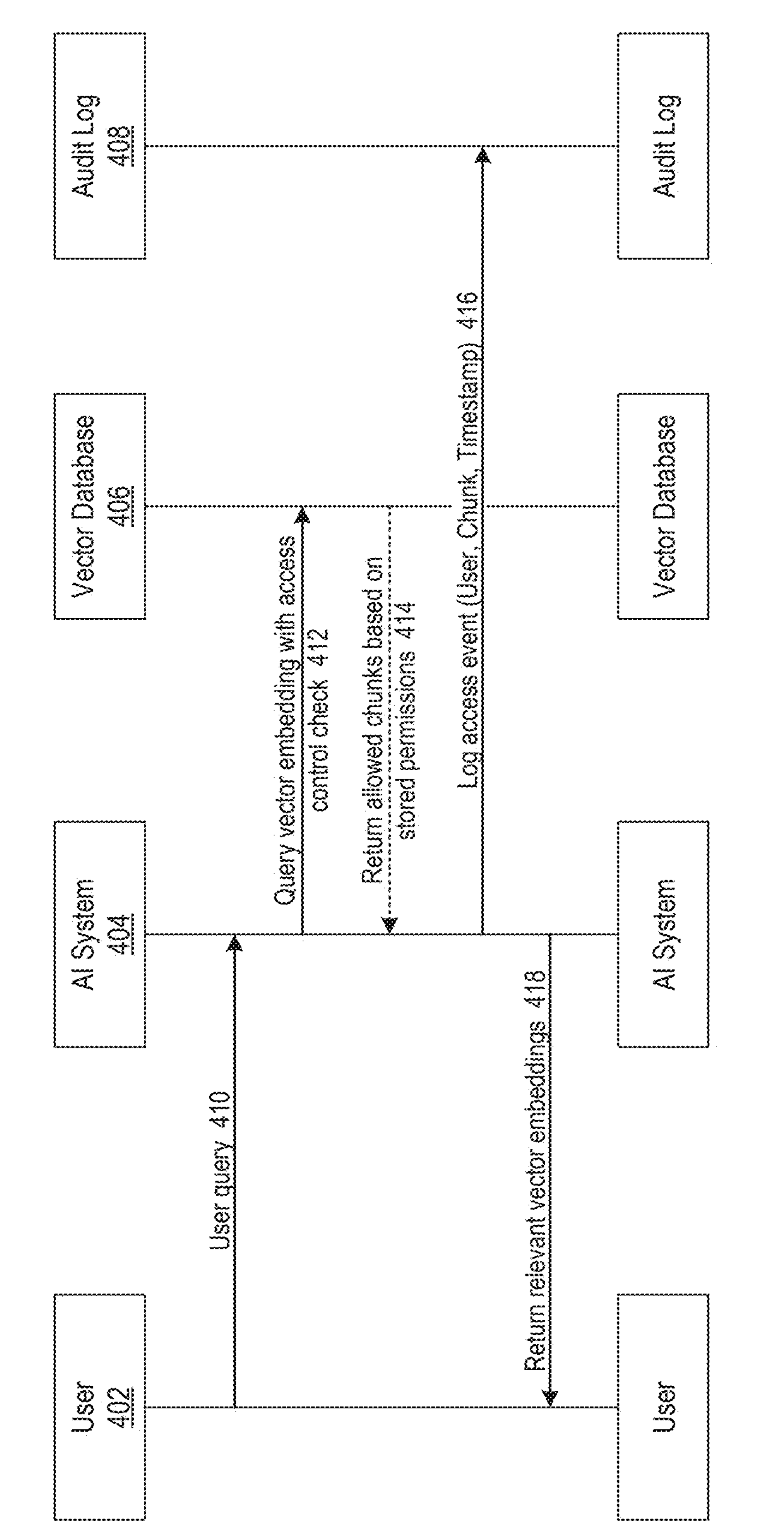
FIG. 4 illustrates an example environment of a data validation platform for data retrieval using chunk-level access controls, in accordance with some implementations of the present technology.

Example Implementations of Using the Data Validation Platform Based on Chunk-Level Access Controls FIG. 4 illustrates an example environment 400 of the data validation platform 102 for data retrieval in accordance with chunk-level access controls. Environment 400 includes a user 402 (e.g., the user 202 in FIG. 2), an AI system 404, a vector database 406, and an audit log 408. The AI system 404 is the same as or similar to AI application 1802 illustrated and described in more detail with reference to FIG. 18. The environment 400 can be implemented using components of example computer system 1700 illustrated and described in more detail with reference to FIG. 17. Likewise, implementations of example environment 400 can include different and/or additional components or can be connected in different ways.

In operation 410, the user can submit a query from the AI system 404. The user 402 can refer to an individual or an automated system (e.g., a software application, or an AI model) attempting to access one or more data chunks. When initiating the request, the user 402 provides an input that includes the instructions for generating the desired output and/or a user identifier. In some implementations, the query is a request for one or more vector embeddings within the vector database 406. The user interface can be a web-based application, a desktop application, a mobile application, and so forth, to enable the user 402 to define the context of the data to be retrieved. In some implementations, the user is an automated system that receives a user query to generate a response. The data validation platform 102 can use one or more embedding models to generate the vector embedding from the received user query.

In operation 412, the AI system 404 queries the vector database 406 with a request for the vector embedding with an access control check. The vector database 406 can store associated access control metadata with the requested documents. Access control metadata refers to the supplementary information embedded within data chunks that specifies the conditions under which access to the data is permitted (e.g., defined by guidelines or entities). This metadata identifies, for example, the users or roles that are authorized to access specific data chunks, the specific permissions granted (such as read, write, or execute), and/or contextual conditions to be met for access to be granted (such as time-based restrictions or location-based constraints). The access control check can be a conditional set of requests to retrieve, for example, data chunks with associated control metadata that indicate a satisfactory degree of access to the user identifier from the user's request. The access control check ensures that only permitted data chunks are retrieved from the vector database 406.

In operation 414, the vector database 406 returns the allowed chunks based on the stored permissions 414. Upon receiving the query, the vector database 406 locates the vector representations and retrieves the corresponding data chunks that match the query criteria (e.g., the chunks associated with the vector embeddings that the user is allowed to access). In some implementations, the vector database 406 evaluate the proximity/degree of similarity between the vector representation of the input and each stored vector embedding by determining, for example, cosine similarity, Euclidean distance, or other metric-based comparisons. The access control metadata embedded within each vector embedding can be used to filter the results. The vector database 406 can compare the access control information from the query with the metadata of each vector representation with a degree of similarity above a specific threshold. The returned data chunks refer to portions of the document set that the user 402 is authorized to access.

In operation 416, the AI system 404 logs the access event (e.g., user, chunk, timestamp) with the audit log 408. Each log entry in the audit log 408 includes information such as the user identifier of the user 402, the specific data chunks accessed, the timestamp of the access event, and so forth. In some implementations, the audit log 408 can be implemented on a blockchain ledger to enable the non-repudiation of the recorded data. When a user accesses data, the data validation platform 102 can generate an audit log entry as a transaction of a smart contract. The transaction can be broadcast to the blockchain network, where network nodes verify and add the transaction to a new block in the blockchain.

In operation 418, the AI system 404 returns the requested vector embeddings to the user. The AI system 404 uses the data chunks retrieved from the vector database 406 to generate the requested vector embeddings that are responsive to the initial input. The response can be transmitted back to the user 402 through the user interface, thus enabling that the user 402 receives only the data they are permitted to access.

Figure 5:
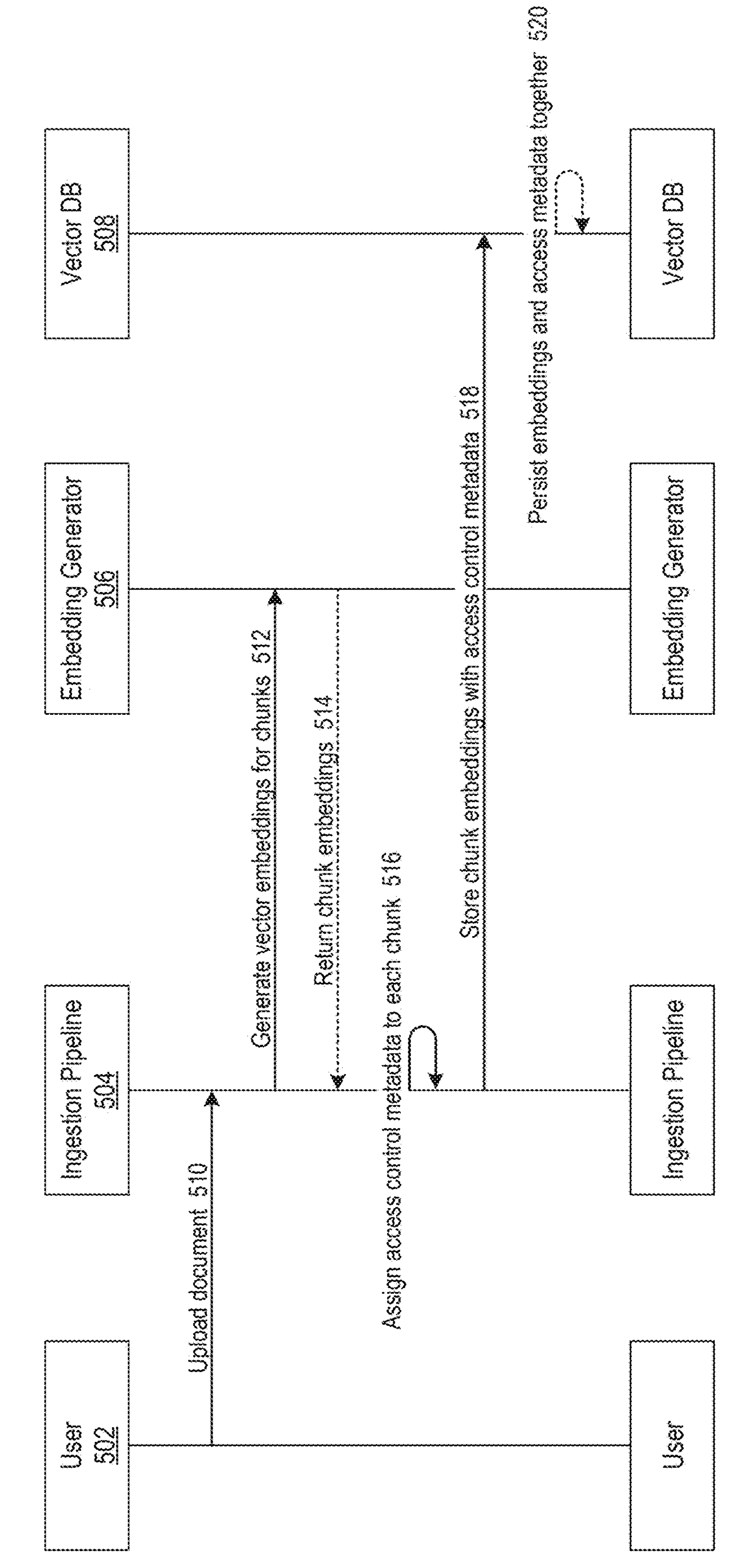
FIG. 5 illustrates an example environment of a data validation platform of for assigning chunk-level access controls to uploaded content in accordance with some implementations of the present technology.

FIG. 5 illustrates an example environment 500 of the data validation platform 102 of FIG. 1 for assigning chunk-level access controls to uploaded content. Environment 500 includes a user 502 (e.g., the user 402 in FIG. 4, the user 202 in FIG. 2), an ingestion pipeline 504, an embedding generator 506, and a vector database 508. The embedding generator 506 is the same as or similar to AI application 1802 illustrated and described in more detail with reference to FIG. 18. The environment 500 can be implemented using components of example computer system 1700 illustrated and described in more detail with reference to FIG. 17. Likewise, implementations of example environment 500 can include different and/or additional components or can be connected in different ways.

In operation 510, the user 502 uploads a document to the ingestion pipeline 504. The user can interact with a user interface (UI) or API to submit the document, which can be in formats such as PDF, DOCX, or TXT. The ingestion pipeline 504 captures and temporarily stores the document for processing. In some implementations, the user selects the file from the user's device and/or indicates a URL from which the document can be fetched.

In operation 512, the ingestion pipeline 504 generates vector embeddings for chunks of data in the document using the embedding generator 506. In some implementations, the ingestion pipeline 504 splits the document into smaller chunks, tokenizes each chunk, and then passes these tokens through a pre-trained machine learning model (such as BERT or GPT) to create high-dimensional vector embeddings. For example, the data validation platform 102 can chunk the document based on various criteria such as paragraph breaks, sentence boundaries, or custom-defined segments. Once the document is chunked, each chunk is tokenized by splitting the text into individual words or subwords. These tokens can be input into the embedding generator 506 to use a pre-trained machine learning model (like BERT, GPT, or RoBERTa) to transform the text chunks into high-dimensional vector embeddings. Each embedding is a numerical representation of the chunk's content, which can be presented as an array of floating-point numbers.

In operation 514, the embedding generator 506 returns the generated vector embeddings for chunks of data in the document to the ingestion pipeline 504. The results can be returned in a structured format, such as JSON. This structured data can include metadata like chunk identifiers and corresponding vector embeddings. The ingestion pipeline 504 receives these embeddings and can map the embeddings to their respective document chunks. In operation 516, the ingestion pipeline assigns access control metadata to each chunk. The access control metadata includes information such as who can access each chunk, under what conditions, and with what permissions (as discussed in more detail with reference to FIG. 4). The metadata can be formatted in a structured form to be subsequently stored and queried.

In operation 518, the ingestion pipeline 504 stores the chunk embeddings with the access control metadata in the vector database 508. In operation 520, the vector database 508 persists the embeddings and access metadata together. The embeddings and their corresponding metadata are written to non-volatile storage, such as disk-based storage or other persistent media, so that the data remains intact across system restarts and failures. The vector database maintains the association between the vector embeddings and their access control metadata so that both are retrieved together during data access operations.

FIG. 6 illustrates an example environment 600 of filtering vector representations of content used by the data validation platform 102 to generate responses. Environment 600 includes a first user 602, a second user 604, a query 606, a first access level indicator 608, a second access level indicator 610, chunks 610, first user accessible chunks 614, second user accessible chunks 616, shared accessible chunks 618, vectorized query representation 620, and vectorized sub-question representations 622. The environment 600 can be implemented using components of example computer system 1700 illustrated and described in more detail with reference to FIG. 17. Likewise, implementations of example environment 600 can include different and/or additional components or can be connected in different ways.

A first user 602 refers to an individual or system entity initiating an interaction with the data validation platform 102. The first user 602 can submit a query 606 (e.g., "What is project zebra about?") to the data validation platform 102. The first user 602 can be associated with one or more specific access permissions defining which data the first user 602 can view or retrieve. Similarly, a second user 604 can be another individual or system entity interacting with the data validation platform 102 (e.g., by submitting a query 606) that is associated with different access permissions compared to the first user 602. A query 606 represents the specific question or data request submitted by the user to the data validation platform 102.

A first access level indicator 608 determines the level of access the first user 602 has concerning specific data chunks. The first access level indicator 608 can be used as a filter to ensure that only the chunks satisfying the corresponding access level metadata of the data chunk are returned in response to the user's query. A second access level indicator 610 applies similarly, specifying the access permissions for the second user 604.

FIG. 6 illustrates a vector space including one or more chunks 612. Chunks 612 refer to the divided parts of the original documents or datasets. First user accessible chunks 614 are data chunks that the first user 602 can access, determined based on their access level indicator 608. Second user accessible chunks 616 refer to data chunks available to the second user 604, based on their access level indicator 610. These chunks align with the type of data the second user is permitted to access. Shared accessible chunks 618 represent those data sections both users can access due to overlapping permissions or similar access level indicators. Shared accessible chunks 618 can be inclusive of data elements accessible to both users.

The data validation platform 102 can represent the original query of the user (e.g., the first user 602 and/or the second user 604) in the form of a vectorized query representation 620 by converting the user's query into a vector representation (e.g., via an embedding model). For example, the embedding model maps the query into a continuous vector space where semantically similar queries are positioned closer together. For instance, variations of the query such as "Tell me about project zebra" or "Describe project zebra" can generate vector representations that are close to the original query's vector in the high-dimensional space. The data validation platform 102 can identify and extract sub-components of the query, or vectorized sub-question representations 622. For example, the query can be partitioned into sub-questions such as "What is project zebra?" and "What are the key aspects of project zebra?" Each sub-question can be independently vectorized using the same or similar embedding model that produced the vectorized query representation 620.

To extract the sub-questions from the query, the data validation platform 102 can tokenize the query by breaking it down into individual components, such as ["What", "is", "project", "zebra", "about?"] while removing punctuation. The data validation platform can identify the grammatical structure within each token, such as identifying "What is" as an interrogative phrase and "project zebra" as a noun phrase. Named Entity Recognition (NER) can be used to detect specific entities, such as "project zebra." The query can then be semantically decomposed into sub-questions like "What is project zebra?" and "What are the key aspects of project zebra?"

Thus, the first user 602 and the second user 604 can receive different responses using the same query 606, since their access controls are different. For example, the system (e.g., AI model) using the first user accessible chunks 614 can receive a less accurate answer overall (since the chunks are further away from the vectorized query representation 620, meaning that the data between are less semantically similar). However, by breaking the query down into sub-questions, the data validation platform 102 is enabled to identify particular sub-questions that the accessible chunks corresponding to the user that can be answered using more semantically similar data.

Figure 7:
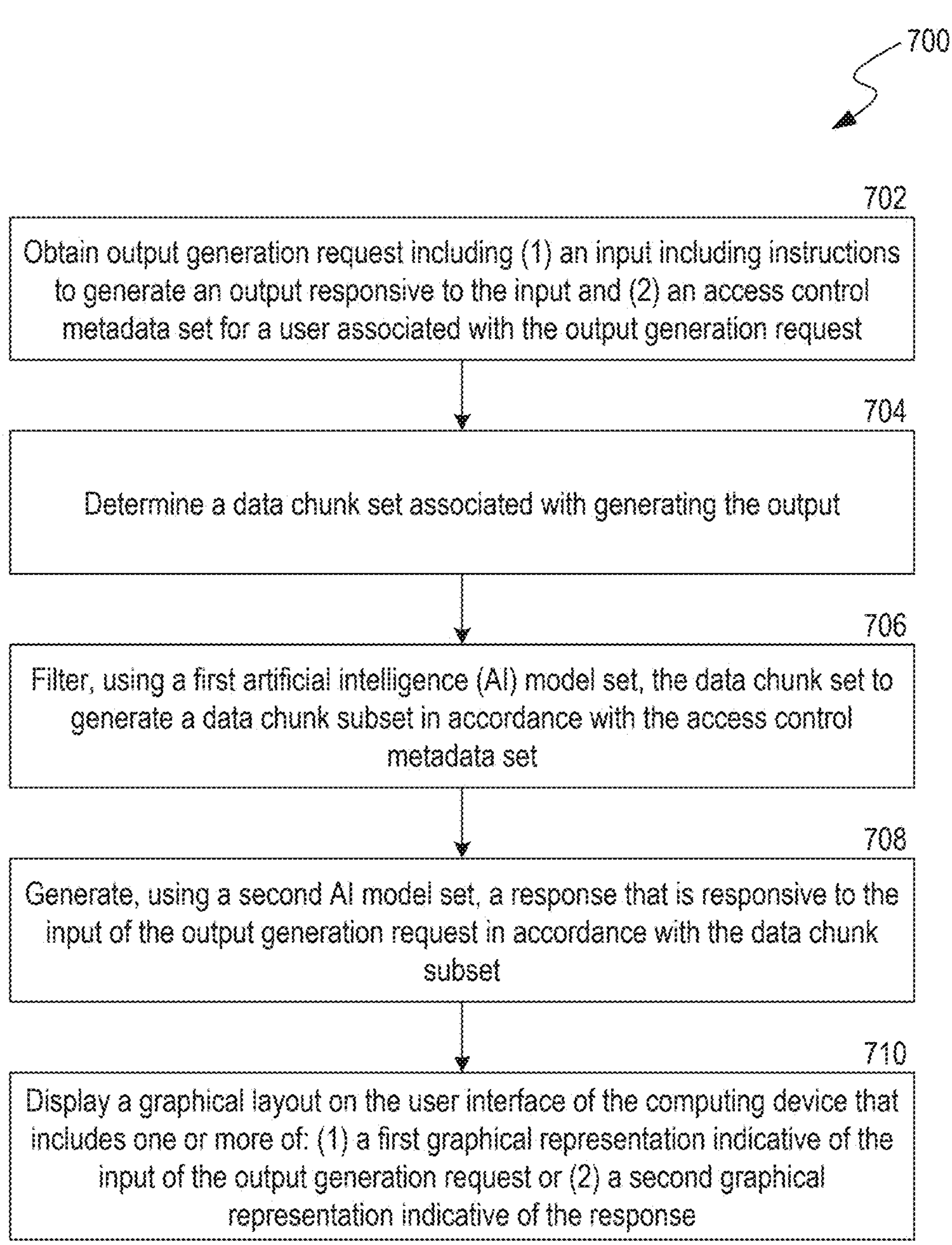
FIG. 7 is a flow diagram illustrating an example process of retrieving data using a data validation platform using chunk-level access controls, in accordance with some implementations of the present technology.

FIG. 7 is a flow diagram illustrating an example process 700 of retrieving data using the data validation platform 102 of FIG. 1 in accordance with chunk-level access controls. In some implementations, the process 700 is performed by a computer system, e.g., example computer system 1700 illustrated and described in more detail with reference to FIG. 17. Implementations can include different and/or additional steps or can perform the steps in different orders.

In operation 702, the data validation platform 102 can receive (e.g., obtain), via a computing device (e.g., a user interface), an output generation request including an input including instructions to generate an output responsive to the input and/or an access control metadata set indicative of a degree of access to a document set within a vector database for a user associated with the output generation request. Each portion of the document set can include a data chunk set of text data, audio data, image data, and/or video data. In some implementations, the access control metadata set includes a user-specific permission, a role-based access control rule corresponding to the user for accessing portions of the document set, and so forth.

In operation 704, the data validation platform 102 can determine a vector representation set of one or more data chunk sets that are associated with generating the output by comparing a vector representation of the received input with corresponding vector representations of each data chunk of the document set.

In operation 706, the data validation platform 102 can filter, using a first AI model set, the data chunk set to generate a data chunk subset. For example, the data validation platform 102 can transmit, using the first AI model set, a query to the vector database. The query can include the vector representation set of one or more data chunk sets and/or the access control metadata set. The data validation platform 102 receives, from the vector database, the data chunk subset by determining a permission indicator for each data chunk of the document set that defines a corresponding degree of access to the data chunk for the user in accordance with the access control metadata set.

In some implementations, the data validation platform 102 can determine a degree of similarity between (1) the vector representation of the received input with (2) corresponding vector representations of each data chunk of the document set. The data validation platform 102 can compare the degree of similarity to a predefined threshold.

In some implementations, the data validation platform 102 can identify an assigned role set of a user within a hierarchal data structure, and traverse the hierarchal data structure to identify the permission indicator for each data chunk of the document set.

In operation 708, the data validation platform 102 can generate, using a second AI model set (same as or different from the first AI model set), a response that is responsive to the input of the output generation request. For example, the data validation platform 102 can transmit the data chunk subset to one or more input nodes of the second AI model set. The data validation platform 102 can receive, from one or more output nodes of the second AI model set, the response.

In operation 710, responsive to generating the response, the data validation platform 102 can display a graphical layout on the user interface of the computing device that includes (1) a first graphical representation indicative of the input within the output generation request and (2) a second graphical representation indicative of the response. In some implementations, the graphical layout further includes a third graphical representation indicating the data chunk subset used to generate the response, and/or a fourth graphical representation indicating the access control metadata set.

Example Methods of Using the Data Validation Platform

Figure 8:
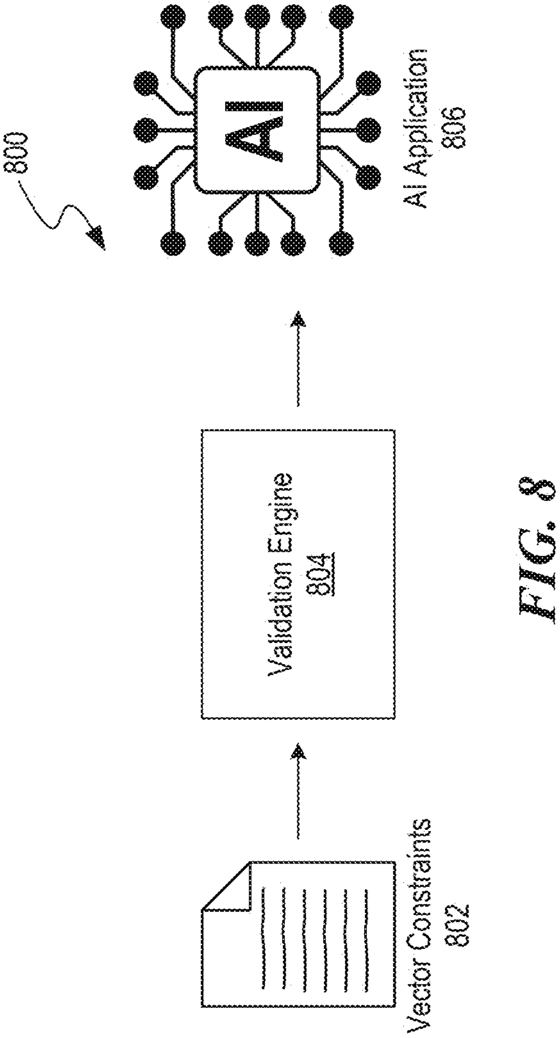
FIG. 8 is a block diagram illustrating an example environment for determining AI compliance, in accordance with some implementations of the present technology.

FIG. 8 is a block diagram illustrating an example environment 800 for determining AI compliance, in accordance with some implementations of the present technology. Environment 800 includes vector constraints 802, validation engine 804, and AI application 806. AI application 806 and validation engine 804 are implemented using components of example computer system 1700 illustrated and described in more detail with reference to FIG. 17. Likewise, implementations of example environment 800 can include different and/or additional components or can be connected in different ways.

The vector constraints 802 operate as an input into the validation engine 804. The vector constraints 802 can encompass guidelines and/or regulations such as regulatory standards, organizational policies, AI application-specific vector constraints, and industry best practices relevant to the AI application's 806 domain. For example, the vector constraints 802 can include best practices or legal obligations such as protections against bias, harmful language (e.g., toxic language), and/or IP violations.

Regulatory standards (e.g., governmental regulations) can include regulations gathered from authoritative sources such as government websites, legislative bodies, and regulatory agencies. Regulatory standards can be published in legal documents or official publications and cover aspects related to the development, deployment, and use of AI technologies within specific jurisdictions. Depending on the jurisdiction in which the platform operates, there can be legal obligations regarding the moderation of certain types of content, such as biased content, hate speech, harassment, or copyrighted material. Organizational policies include internal policies, procedures, and vector constraints established by organizations to govern AI-related activities within the organization's operations. Organizational policies can be developed in alignment with industry standards, legal requirements, and organizational objectives. Organizational policies can include standards for acceptable content, and/or procedures for determining violations. AI application-specific vector constraints include vector constraints that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, can be subject to vector constraints that prevent bias and discrimination in unsupervised learning models. Natural language processing (NLP) technologies, which enable computers to understand, interpret, and generate human language, can be subject to specific vector constraints aimed at safeguarding user privacy. Generative AI, which autonomously creates new content, can focus on intellectual property rights, content moderation, and ethical use cases. AI developers can need to incorporate additional mechanisms for copyright protection, content filtering, and/or user consent management to comply with vector constraints related to generative AI technologies.

The validation engine 804 can be communicatively connected to an API and/or other data sources containing regulatory documents and organizational policies to obtain the vector constraints 802. Connecting to an API allows for real-time access to the latest guidelines and updates and ensures that the validation process is based on the most current guidelines. For example, the API can provide endpoints for querying specific regulations or policies based on keywords, categories, or jurisdictions that enable dynamic retrieval of relevant guidelines.

In some implementations, vector constraints 802 are obtained by manual input by users. For example, users input relevant regulations and policies (e.g., vector constraints 802) directly into the validation engine 804 through a user interface communicatively connected to the validation engine 804. In some implementations, vector constraints 802 are obtained from pre-existing databases or repositories maintained by regulatory bodies, industry organizations, and/or third-party providers. The databases can be periodically updated and synchronized with the validation engine 804 to ensure alignment with the latest regulatory changes and industry standards. Additionally, machine learning algorithms can be employed to automatically identify and extract vector constraints 802 from unstructured text data, reducing the need for manual intervention in the data collection process.

To incorporate vector constraints 802 into the validation process, the vector constraints 802 can be parsed, processed, and translated into actionable criteria for assessment. The validation engine 804 can analyze the textual content of the vector constraints 802, extract relevant information, and categorize the vector constraints 802 based on predefined criteria (e.g., standards, rules, or parameters established in advance to guide the analysis and categorization of textual content). For example, even if the vector constraints 802 exist in different formats and structures, Natural Language Processing (NLP) techniques can be used to parse each text and identify key regulations, policies, and practices embedded within the differently formatted vector constraints 802. The validation engine 804 can identify specific terms, phrases, or clauses that likely denote regulatory requirements, as well as understand the context and intent behind the provisions. For example, the validation engine 804 identifies terms or phrases indicating regulations concerning the collection of personal data, such as "consent," "data minimization," or "lawful basis," and categorizes vector constraints 802 including the identified words and phrases as containing provisions related to obtaining user consent for data processing or specifying permissible purposes for data collection. Further methods of identifying relevant features within the vector constraints 802 are discussed with reference to FIGS. 11-7.

In some implementations, once the vector constraints 802 are obtained, the vector constraints 802 are pre-processed into a standardized format suitable for assessment by the validation engine 804. For example, the vector constraints 802 can be encoded into a structured representation (e.g., JSON, XML), with specific fields for criteria, requirements, and/or thresholds. In some implementations, the vector constraints 802 are categorized and tagged based on the extent of the vector constraint's 802 relevance to different aspects of AI compliance (e.g., fairness, transparency, privacy, security). Example methods of identifying relevant vector constraints and tagging the vector constraints 802 are discussed further in FIGS. 11-7.

The validation engine 804 evaluates the AI application's 806 compliance with the vector constraints 802. The validation engine 804 inputs validation actions (e.g., test cases) created from the criteria in the vector constraints 802 into the AI application 806 and evaluates the AI application's 806 outcomes and explanations. Methods of evaluating the AI application 106's compliance with the vector constraints 802 are discussed in further detail with references to FIGS. 15 and 16. In some implementations, manual review by another individual can be used to validate the results of the validation engine.

The AI application's 806 outcome and explanation include alphanumeric characters representing the result of the AI application's 806 decision-making process. For example, in a loan approval application, the outcome can consist of alphanumeric values indicating whether a loan application is approved or denied based on the AI application's 806 assessment of the applicant's creditworthiness. The explanation generated by the AI application 806 includes a set of descriptors associated with a series of steps taken by the AI application 806 to arrive at the outcome (e.g., result). The descriptors provide insights into the decision-making process followed by the AI application 806, such as the factors considered, the data utilized, and the reasoning behind the decision. The descriptors can encompass various elements such as a ranking of the considered feature based on importance, decision paths, confidence scores, or probabilistic estimates associated with different outcomes.

Figure 9:
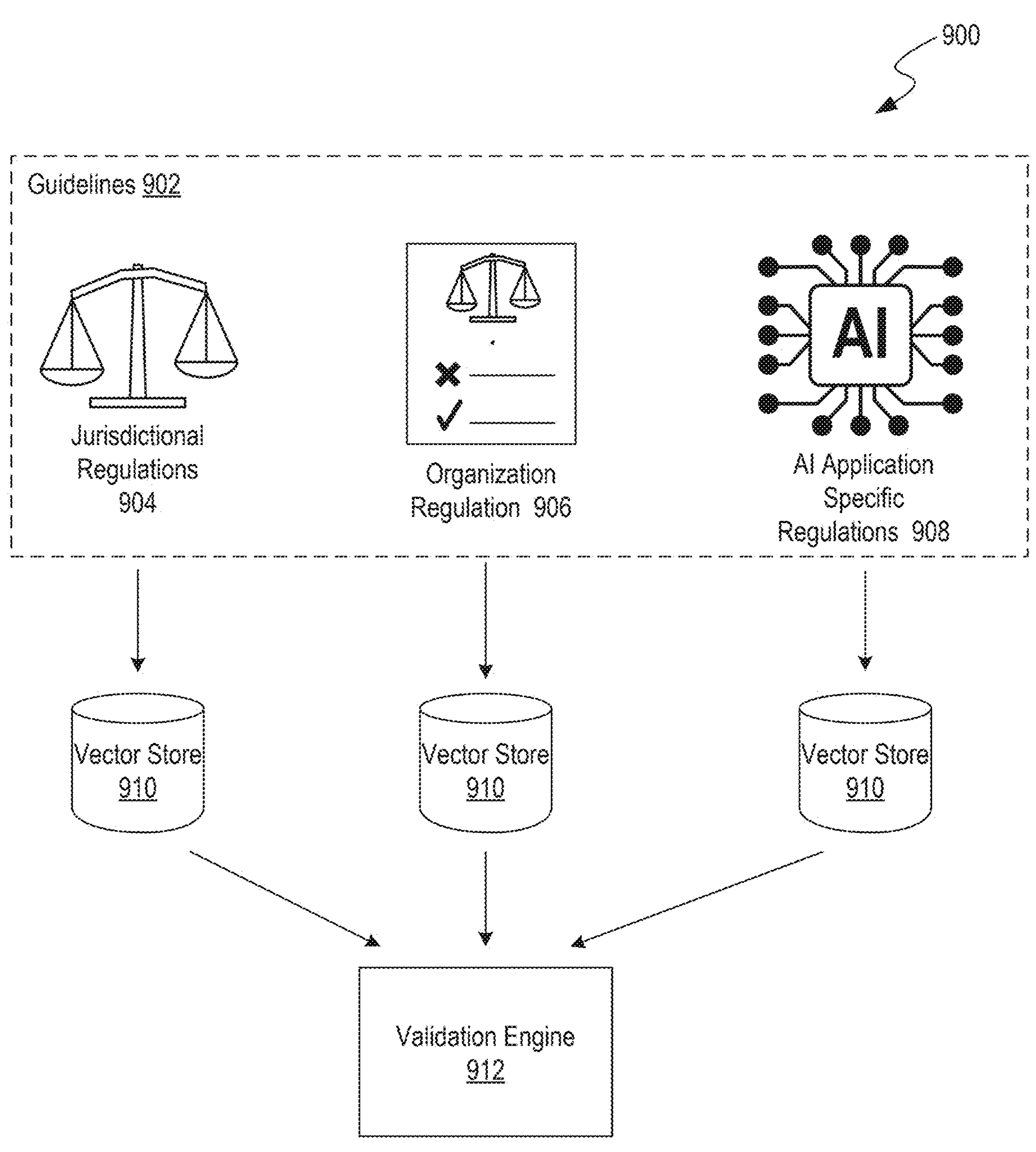
FIG. 9 is a block diagram illustrating an example environment for using the guidelines input into the validation engine for determining AI compliance, in accordance with some implementations of the present technology.

FIG. 9 is a block diagram illustrating an example environment 900 for using the guidelines input into the validation engine for determining AI compliance, in accordance with some implementations of the present technology. Environment 900 includes guidelines 902 (e.g., jurisdictional regulations 904, organization regulation 906, AI application-specific regulations 908), vector store 910, and validation engine 912. Guidelines 902 can be any of the vector constraints 802 illustrated and described in more detail with reference to FIG. 8. Validation engine 912 is the same as or similar to validation engine 804 illustrated and described in more detail with reference to FIG. 8. Vector store 910 and validation engine 912 are implemented using components of example computer system 1700 illustrated and described in more detail with reference to FIG. 17. Likewise, embodiments of example environment 900 can include different and/or additional components or can be connected in different ways.

Guidelines 902 can include various elements such as jurisdictional regulations 904, organizational regulations 906, and AI applications-specific regulations 908 (e.g., unsupervised learning, natural language processing (NLP), generative AI). Jurisdictional regulations 904 (e.g., governmental regulations) can include regulations gathered from authoritative sources such as government websites, legislative bodies, and regulatory agencies. Jurisdictional regulations 904 can be published in legal documents or official publications and cover aspects related to the development, deployment, and use of AI technologies within specific jurisdictions. Organizational regulations 906 includes internal policies, procedures, and guidelines established by organizations to govern AI-related activities within the organization's operations. Organizational regulations 906 can be developed in alignment with industry standards, legal requirements, and organizational objectives. AI application-specific regulations 908 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 902 are stored in a vector store 910. The vector store 910 stores the guidelines 902 in a structured and accessible format (e.g., using distributed databases or NoSQL stores), which allows for efficient retrieval and utilization by the validation engine 912. In some implementations, the guidelines 902 are preprocessed to remove any irrelevant information, standardize the format, and/or organize the guidelines 902 into a structured database schema. Once the guidelines 902 are prepared, the guidelines 902 can be stored in a vector store 910 using distributed databases or NoSQL stores.

To store the guidelines 902 in the vector store 910, the guidelines 902 can be encoded into vector representations for subsequent retrieval by the validation engine 912. The textual data of the guidelines 902 are transformed into numerical vectors that capture the semantic meaning and relationships between words or phrases in the guidelines 902. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 902. For example, the system can assign higher weights to words that are more unique to a specific document and less common across the entire corpus.

In some implementations, the guidelines 902 are stored using graph databases such as Neo4j™ or Amazon Neptune™. Graph databases represent data as nodes and edges, allowing for the modeling of relationships between guidelines 902 to demonstrate the interdependencies. In some implementations, the guidelines 902 are stored in a distributed file system such as Apache Hadoop™ or Google Cloud Storage™. These systems offer scalable storage for large volumes of data and support parallel processing and distributed computing. Guidelines 902 stored in a distributed file system can be accessed and processed by multiple nodes simultaneously, which allows for faster retrieval and analysis by the validation engine.

The vector store 910 can be stored in a cloud environment hosted by a cloud provider, or a self-hosted environment. In a cloud environment, the vector store 910 has the scalability of cloud services provided by platforms (e.g., AWS™, Azure™). Storing the vector store 910 in a cloud environment entails selecting the cloud service, provisioning resources dynamically through the provider's interface or APIs, and configuring networking components for secure communication. Cloud environments allow the vector store 910 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 910 is stored on a private web server. Deploying the vector store 910 in a self-hosted environment entails setting up the server with the necessary hardware or virtual machines, installing an operating system, and storing the vector store 910. In a self-hosted environment, organizations have full control over the vector store 910, allowing organizations to implement customized security measures and compliance policies tailored to the organization's specific needs. For example, organizations in industries with strict data privacy and security regulations, such as finance institutions, can mitigate security risks by storing the vector store 910 in a self-hosted environment.

The validation engine 912 accesses the guidelines 902 from the vector store 910 to initiate the compliance assessment. The validation engine 912 can establish a connection to the vector store 910 using appropriate APIs or database drivers. The connection allows the validation engine 912 to query the vector store 910 and retrieve the relevant guidelines for the AI application under evaluation. Frequently accessed guidelines 902 are stored in memory, which allows the validation engine 912 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 902. Example methods of identifying relevant guidelines 902 are discussed further in FIG. 10.

The validation engine 912 evaluates the AI application's compliance with the retrieved guidelines 902, (e.g., using semantic search, pattern recognition, and machine learning techniques). For example, the validation engine 912 compares the vector representations of the different explanations and outcomes by calculating the cosine of the angle between the two vectors indicating the vectors' directional similarity. Similarly, for comparing explanations, the validation engine 912 can measure the intersection over the union of the sets of words in the expected and case-specific explanations. Further evaluation techniques in determining compliance of AI applications are discussed with reference to FIGS. 10-18.

Figure 10:
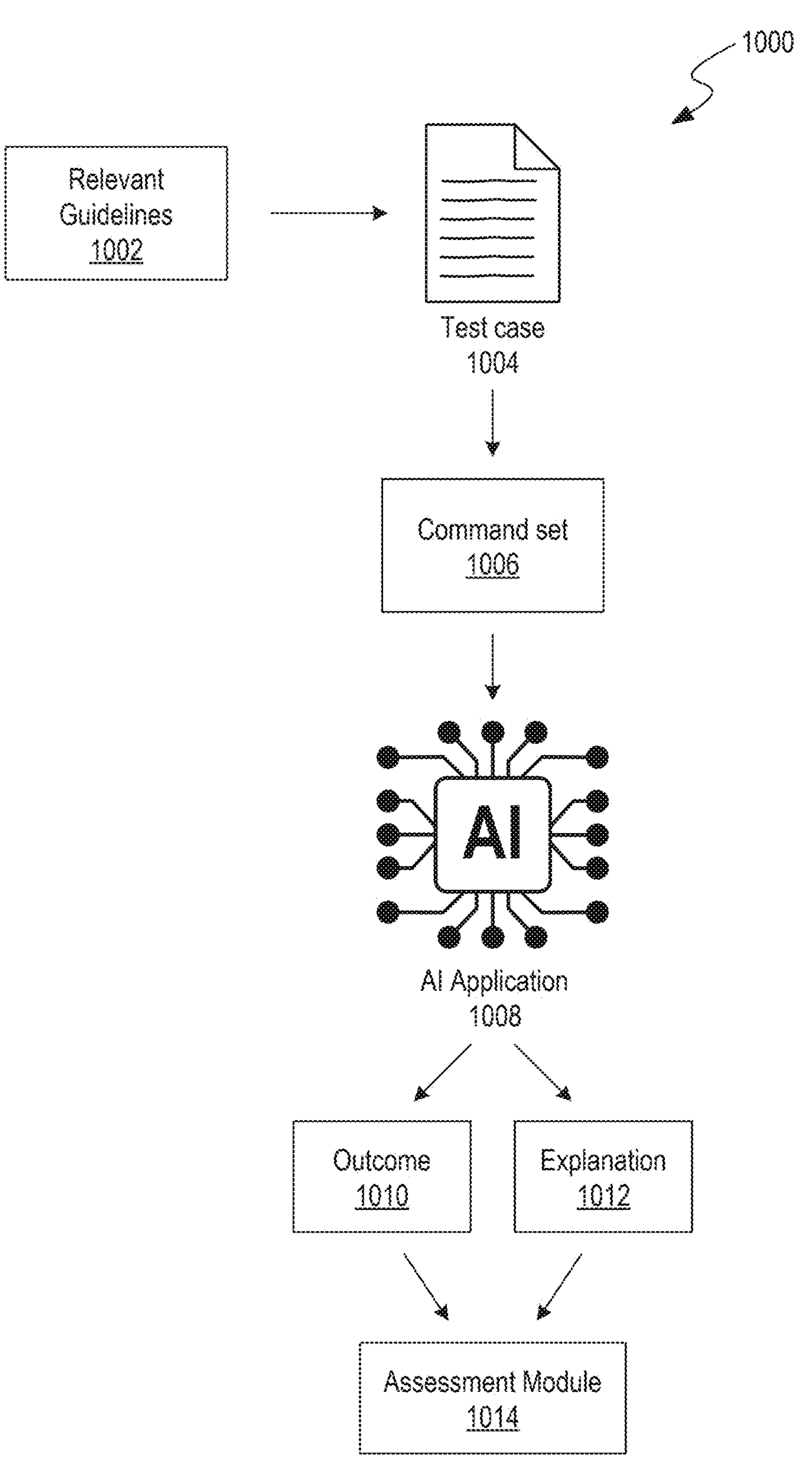
FIG. 10 is a block diagram illustrating an example environment using test cases derived from the guidelines to determine AI compliance, in accordance with some implementations of the present technology.

FIG. 10 is a block diagram illustrating an example environment 1000 using test cases derived from the guidelines to determine AI compliance, in accordance with some implementations of the present technology. Environment 1000 includes relevant guidelines 1002, test case 1004, command set 1006, AI application 1008, outcome 1010, explanation 1012, and assessment module 1014. Guidelines 1002 can be any of the vector constraints 802 illustrated and described in more detail with reference to FIG. 8. Example outcomes 1010 and explanations 1012 of the AI application are discussed further in FIG. 8. AI application 1008 and assessment module 1014 are implemented using components of example computer system 1700 illustrated and described in more detail with reference to FIG. 17. Likewise, embodiments of example environment 1000 can include different and/or additional components or can be connected in different ways.

The relevant guidelines 1002 can be specifically selected based on the specific context and requirements of the AI application being evaluated. For example, the system analyzes metadata tags, keywords, or categories associated with the guidelines 1002 stored in the system's database. Using the specific context and requirements of the AI application, 1008 the system filters and retrieves the relevant guidelines 1002 from the database.

Various filters can be used to select relevant guidelines 1002. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

In some embodiments, the guidelines are stored in vector space. Further methods of storing the guidelines 1002 in vector space are discussed in FIG. 9. To identify the relevant guidelines 1002 from the guidelines, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant guidelines 1002 with attributes that help contextualize the relevant guidelines 1002. The tags serve as markers that categorize and organize the guidelines based on predefined criteria, such as regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline 1002 is linked to the guideline's 1002 corresponding tags and regulatory provisions. Additionally, the guidelines 1002 can be represented in a vector space model, where each guideline is mapped to a high-dimensional vector representing the guideline's 1002 semantic features and relationships with other guidelines.

The relevant guidelines 1002 are used to construct test cases 1004 (e.g., validation actions) which can include prompts that represent real-world scenarios, along with expected outcomes and explanations. In some implementations, the prompt can specify the guidelines to be considered when generating the expected outcomes and explanations. For example, when the prompt comprises a question related to whether a certain action complies with organizational regulations, the prompt indicates to the system to select/target guidelines defined by the organizational regulations. The prompt from the test case 1004 operates as a command set 1006, which operates as the input for the AI application 1008. Once the command set 1006 is generated, the command set 1006 is used as input for the AI application 1008, which processes the commands and generates outcomes 1010 and explanations 1012 based on the AI application's 1008 internal decision-making processes. Example outcomes and expected explanations of the AI application 1008 are discussed further in FIG. 8. The test cases' 1004 expected outcomes can include a set of alphanumeric characters. The expected explanation in the corresponding test case can include a set of descriptors associated with a series of steps taken to arrive at the expected outcome (e.g., result). The descriptors provide insights into the expected decision-making process, such as the factors considered, the data utilized, and the reasoning behind the decision. The descriptors can encompass various elements such as feature importance rankings, decision paths, confidence scores, or probabilistic estimates associated with different outcomes.

The AI application 1008 processes the command set and generates an outcome 1010 and explanation 1012 on how the outcome 1010 was determined based on the AI application's 1008 internal algorithms and decision-making processes. The outcome 1010 and explanation 1012 are evaluated by the assessment module 1014, which compares the outcome 1010 and explanation 1012 against the expected outcomes and explanations specified in the test case 1004 derived from the relevant guidelines 1002. Methods of evaluating the AI application 1008's compliance with the relevant guidelines 1002 are discussed in further detail with references to FIGS. 10-18. Any discrepancies or deviations between the observed and expected behavior are flagged as potential compliance issues, warranting further investigation or corrective action. The discrepancies or deviations can be transmitted as an alert to persons to validate the engine's performance.

Figure 11:
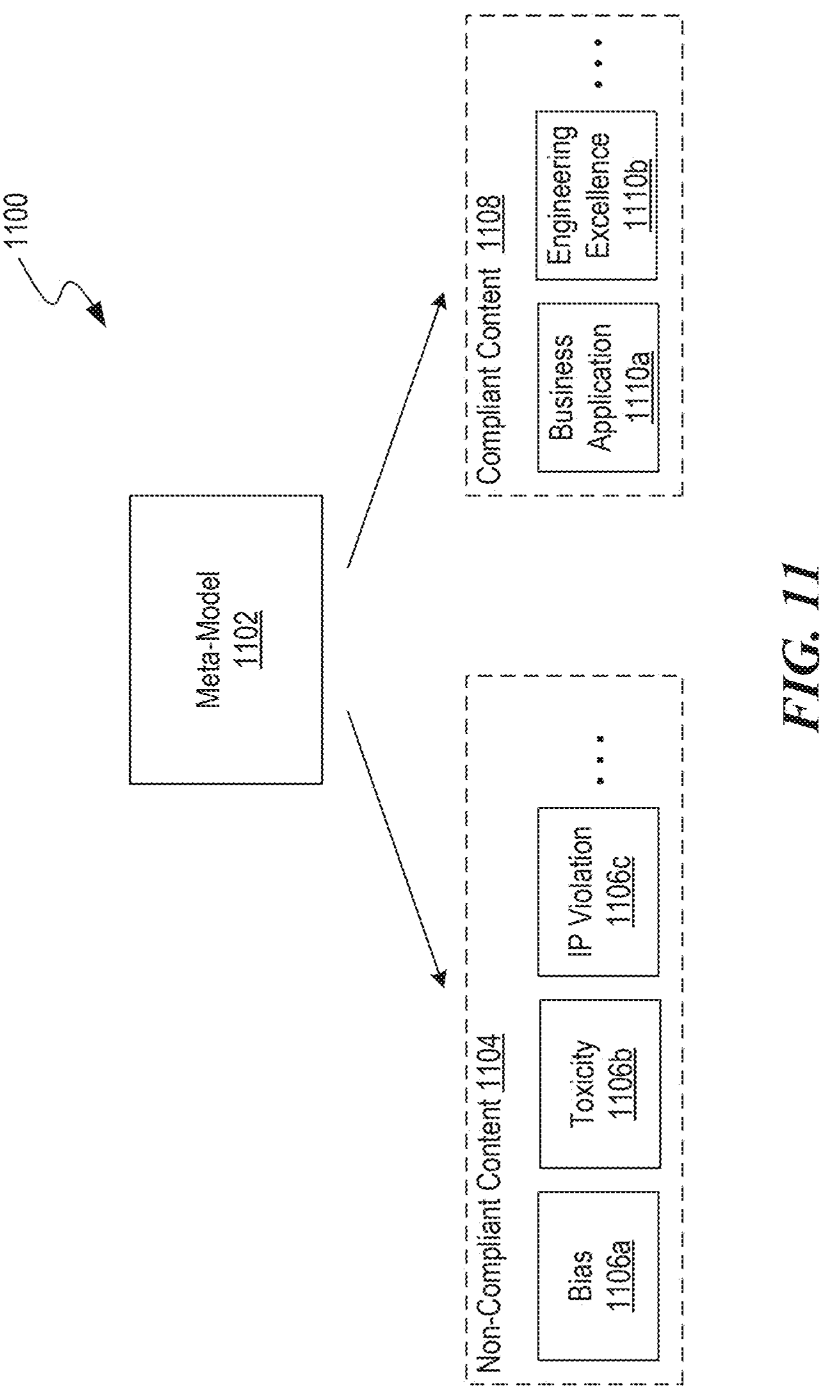
FIG. 11 is a block diagram illustrating an example environment for determining non-compliant content, in accordance with some implementations of the present technology.

FIG. 11 is a block diagram illustrating an example environment 1100 for determining non-compliant content, in accordance with some implementations of the present technology. Environment 1100 includes meta-model 1102, non-compliant content 1104, and compliant content 1108. The meta-model 1102 can be implemented using components of example computer system 1700 illustrated and described in more detail with reference to FIG. 17 and/or the validation engine 804 and validation engine 912 illustrated and described in more detail with reference to FIGS. 8 and 9 respectively. Likewise, implementations of example environment 1100 can include different and/or additional components or can be connected in different ways.

The meta-model 1102 discerns between different types of content based on predefined criteria and standards. The predefined criteria and standards against which content will be evaluated can be specific rules, thresholds, or guidelines (e.g., vector constraints 802) that determine what constitutes non-compliant content 1104 and compliant content 1108 within the context of the AI application. For example, the criteria can be informed by domain knowledge, regulatory requirements, or organizational policies.

Non-compliant content 1104 encompasses various forms of content that deviate from established standards or regulations (e.g., vector constraints 802), such as biased content 1106*a*, toxic content 1106*b*, and/or IP violations 1106*c*. Biased content 1106*a* refers to unfair or prejudiced treatment within the content. Toxic content 1106*b*, or harmful content, denotes harmful language, including hate speech or misinformation. IP violations 1106*c* indicate instances of infringement upon intellectual property rights.

To identify biased content 1106*a* within the AI model, the system can analyze vector representations of the content and compare the vector representations against a reference dataset containing examples of unbiased content. By quantifying differences in the vector representations, the system can flag instances where the content demonstrates a disproportionate association with certain attributes. In some implementations, the system can employ machine learning algorithms trained to recognize patterns in the vector representations indicative of biased language directly from the vector space, without relying on reference datasets. Further methods of identifying biased content 1106*a* are discussed with reference to FIG. 12.

Detecting toxic content 1106*b* involves analyzing linguistic patterns and semantic cues within the vector representations of the content. Algorithms can be trained to recognize patterns indicative of harmful language, such as hate speech or misinformation, directly from the vector space. By evaluating the proximity, frequency, and/or association of specific terms or phrases within the vector space, the system can identify toxic content that deviates from acceptable language standards. Further methods of identifying toxic content 1106*b* are discussed with reference to FIG. 13.

To detect IP violations 1106*c*, the system can compare vector representations of the content against a database of known intellectual property content. Using similarity detection algorithms, the system can identify instances where the content bears resemblance to copyrighted material, trademarks, or other protected intellectual property. By measuring the similarity between vector representations, the system can flag potential IP violations for further review and action. Further methods of identifying IP violations 1106*c* are discussed with reference to FIG. 14.

On the other hand, compliant content 1108 meets the required criteria (e.g., adheres to vector constraints 802, such as, for example, not exhibiting bias, toxicity, or IP violations). The compliant content 1108 can include business applications 1110*a*, which adhere to industry standards and ethical guidelines, along with content showcasing engineering excellence 1110*b* by meeting technical specifications and best practices. Categorizing content into non-compliant and compliant categories allows organizations to identify areas of concern within the AI model and take appropriate actions to mitigate risks, ensure compliance, and uphold ethical standards in the deployment of an AI application.

To categorize content as compliant or non-compliant, the meta-model 1102 analyzes vector representations of the content and compares the vector representations against the vector constraints. In some implementations, machine learning algorithms are used to discern between non-compliant content 1104 and compliant content 1108. The meta-model 1102 can be trained on a labeled dataset containing examples of different types of content, each tagged with its corresponding category (e.g., compliant or non-compliant). Through iterative training iterations, the meta-model 1102 learns to identify patterns and features that distinguish between the various content types, thereby enabling the meta-model 1102 to make accurate classifications. Alternatively, a rule-based system can be used within the meta-model 1102. In the approach, a set of predefined rules or decision criteria are defined of what constitutes compliant and non-compliant content (e.g., vector constraints). The rules are input into the meta-model 1102, allowing the meta-model 1102 to evaluate incoming content against the established criteria and make decisions accordingly. In some implementations, a hybrid approach combining machine learning and rule-based techniques can be used. For example, the meta-model 1102 can use machine learning algorithms for pattern recognition and rule-based systems for domain-specific regulations.

Figure 12:
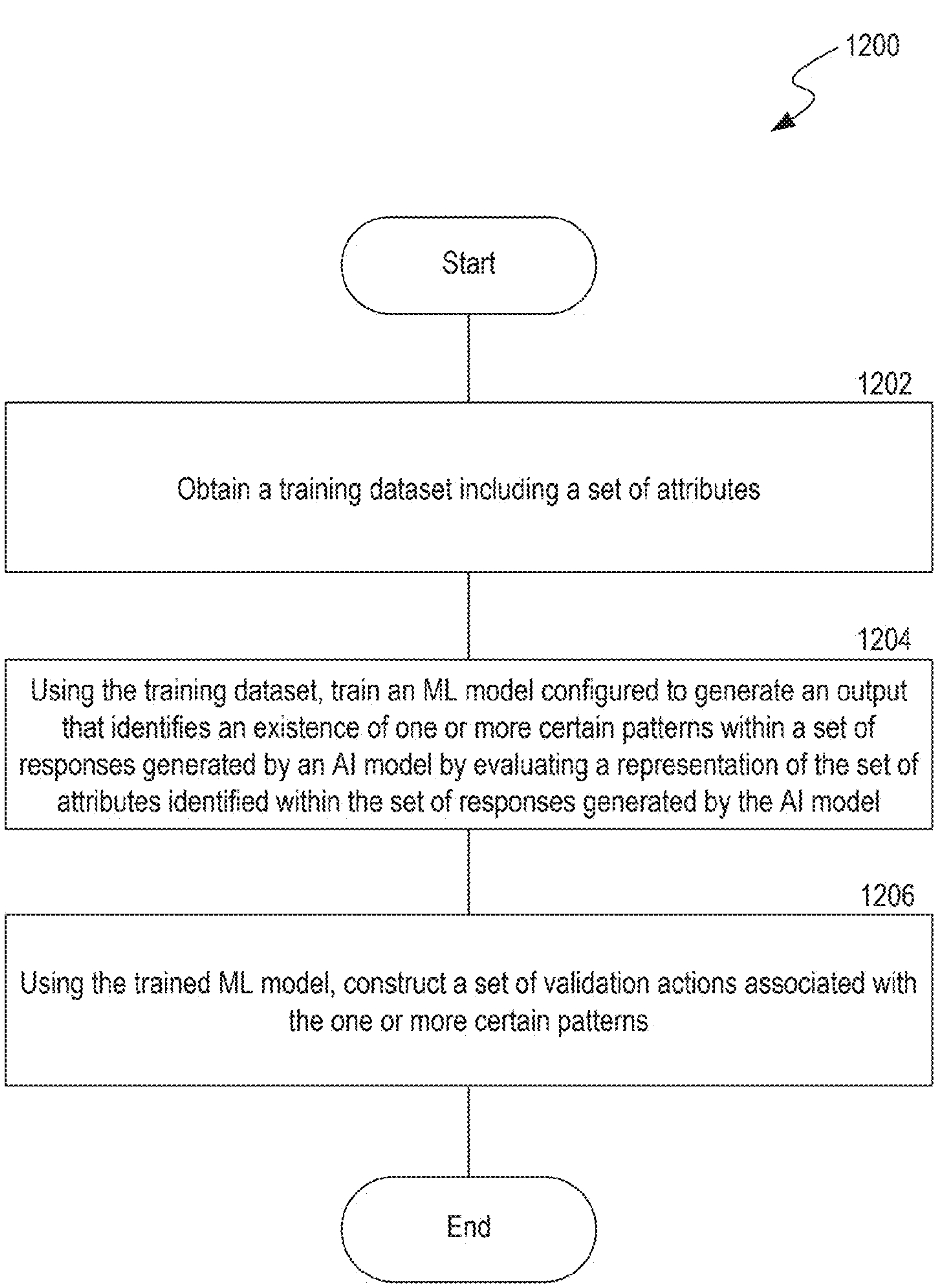
FIG. 12 is a flowchart depicting an example method of detecting certain patterns within an output of an AI model, in accordance with some implementations of the present technology.

FIG. 12 is a flowchart depicting an example method 1200 of detecting certain patterns within an output of an AI model, in accordance with some implementations of the present technology. In some implementations, the process is performed by a computer system, e.g., example computer system 1700 illustrated and described in more detail with reference to FIG. 17. Particular entities, for example, AI application 806, 1008 are illustrated and described in more detail with reference to FIGS. 8 and 10. Likewise, implementations can include different and/or additional steps or can perform the steps in different orders.

In operation 1202, the system obtains a training dataset including a set of attributes. The attributes within the dataset represent various features or characteristics of the data that can be relevant to the detection of bias within the AI model. For example, in a hiring scenario, attributes can include candidate qualifications, experience, and demographic information. In a loan approval context, attributes can encompass factors such as income, credit score, and loan amount requested.

In some implementations, the training data is labeled data. Labeled data is annotated with ground truth labels or outcomes, providing explicit guidance for the learning algorithm during training. For example, in a dataset of loan application reviews, each entry with corresponding attributes (e.g., gender, financial income) can be labeled as either "biased" or "unbiased." In some implementations, the training data is unlabeled data. Unlabeled data lacks explicit annotations and requires the model to infer patterns and structures independently. For example, unlabeled data can include only the set of loan application reviews with the attributes, without being labeled as "biased" or "unbiased."

For data privacy reasons, synthetic data can be generated and used as the training dataset. Generative adversarial networks (GANs), which consist of two neural networks—a generator and a discriminator—can be trained iteratively to generate realistic-looking data samples. The generator network creates synthetic data samples from random noise or latent vectors. The generated samples are fed into the discriminator network, along with real data samples from the training dataset. The discriminator distinguishes between real and synthetic data samples. As the training progresses, both networks engage in a competitive process where the generator aims to produce increasingly realistic samples, while the discriminator becomes more adept at distinguishing between real and synthetic data. Through the iterative process, the generator network learns to generate synthetic data that closely matches the statistical properties and distribution of the real data. This enables the creation of synthetic data samples that exhibit similar patterns, features, and characteristics as the original dataset, without directly exposing sensitive information or violating privacy constraints.

In operation 1204, using the training dataset, the system trains an ML model to generate an output that identifies an existence of certain patterns within a set of responses generated by an AI model. Further discussion of Artificial Intelligence and training methods are discussed in FIG. 16. The AI model, in response to a command set, generates the set of responses including a result (e.g., an outcome) and a set of descriptors associated with a series of steps to generate the result (e.g., an explanation). Examples of the AI model's responses are further discussed with reference to FIG. 8.

The ML model evaluates a representation of the set of attributes identified within the set of responses generated by the AI model. By extracting and evaluating the attributes, the ML model can be trained to recognize certain patterns associated with biased language or behavior within the training dataset. Each certain pattern represents a disproportionate association of one or more attributes of the set of attributes within the result and/or the set of descriptors associated with the series of steps to generate the result.

If the ML model is provided with labeled data as the training data, the ML model can, in some implementations, filter the attributes within the training dataset and identify the most informative attributes (e.g., certain patterns) for bias detection. For example, attributes such as gender and race can be more informative of the presence or absence of bias in a loan application context than attributes such as pet ownership status. Correlation, mutual information, and/or significance tests can be used to rank the attributes based on the discriminatory power. Correlation analysis measures the strength and direction of the linear relationship between each attribute and the target variable (in this case, the presence of bias). Attributes with higher correlation coefficients are considered more relevant for bias detection. For example, a correlation coefficient close to +1 indicates a strong positive linear relationship, while a coefficient close to −1 indicates a strong negative linear relationship. Mutual information estimation quantifies the amount of information shared between each attribute and the target variable, identifying attributes with higher mutual information as more informative for bias detection. Significance tests, such as t-tests or chi-squared tests, assess whether the distribution of each attribute significantly differs between biased and unbiased instances. Attributes with significant differences in distribution are deemed more discriminatory for bias detection. For example, if the p-value resulting from the significance test is below a predetermined threshold (e.g., 0.05), the p-value indicates that the observed differences are statistically significant, suggesting that the attribute is informative for bias detection. Once the attributes are ranked based on discriminatory power, the system selects only the most informative features to reduce the dimensionality of the dataset. By selecting only the most informative features, filter methods help reduce the dimensionality of the dataset, leading to faster processing times and improved model performance.

If the ML model is provided with unlabeled data as the training data, the ML model can use unsupervised learning techniques to identify patterns and structures within the training data. For example, clustering algorithms, which group similar instances based on shared characteristics, can be used to identify clusters of text passages that exhibit similar patterns of potentially biased language or behavior. Clustering algorithms such as k-means or hierarchical clustering can be applied to the unlabeled text data to group instances that share common attributes or features. The algorithms partition the data into clusters such that instances within the same cluster are more similar to each other than to instances in other clusters. By examining the contents of each cluster, the ML model can identify patterns indicative of bias, such as the frequent occurrence of certain words or phrases associated with biased language. Additionally, topic modeling, which identifies underlying themes or topics present in the text data can be used by the ML model to automatically identify topics within a corpus of text documents. Each topic represents a distribution over words, and documents are assumed to be generated from a mixture of the topics. By analyzing the topics inferred from the unlabeled data, the bias detection model can gain insights into the underlying themes or subjects that can be associated with bias.

Further, word embedding models such as Word2Vec or GloVe can be used to represent words in a continuous vector space, capturing semantic relationships between words. Further discussion of representing words in a continuous vector space is discussed in FIG. 13. During training, the word embedding model analyzes the co-occurrence patterns of words within the text corpus to learn the vector representations. Words that frequently appear together in similar contexts will be assigned vectors that are closer together in the vector space, while words that rarely co-occur or have different meanings will be farther apart. The model can capture semantic similarities and relationships between words, even if the words do not share explicit annotations or labels. Once trained, the word embeddings can be used by the ML model to identify words or phrases that are frequently associated with bias in the unlabeled training data. By examining the proximity or similarity of word vectors in the embedding space, the ML model can detect patterns indicative of biased language or behavior. For example, words with negative connotations or those commonly used to stereotype certain groups can cluster together in the vector space, providing insight into potential sources of bias within the text data.

In some implementations, the trained ML model detects certain patterns from the alphanumeric characters of the response in the AI model by analyzing the frequency of certain words or phrases, detecting syntactic structures, and/or identifying linguistic patterns indicative of bias. The presence of stereotypical language, discriminatory terms, or imbalanced representations of demographic groups within the alphanumeric characters can serve as potential indicators of bias.

By tallying the occurrence of words or phrases associated with biased language or discriminatory behavior, the ML model can identify potential patterns indicative of bias. For example, the disproportionate use of terms related to race, gender, or ethnicity can signal underlying biases embedded within the AI-generated responses. Through frequency analysis, the ML model can discern whether certain linguistic expressions occur more frequently in contexts associated with biased content. For example, if certain terms like "young," "elderly," or "single parent" occur more frequently in rejected loan applications compared to approved ones, the frequency disparity can signal potential bias based on age or family status.

The ML model can parse the textual data to identify grammatical relationships and structural patterns. For example, the model can analyze sentence structures, verb conjugations, or noun phrases to uncover nuances that can reveal biased language or unfair treatment. For example, if rejected applications tend to contain phrases like "low-income families struggle" or "single mothers face financial hardship" in the training dataset, while approved applications feature more neutral statements, such syntactic patterns can suggest underlying biases against specific socioeconomic groups.

Linguistic patterns indicative of bias within the alphanumeric characters, such as stereotypical portrayals, prejudiced attitudes, or discriminatory remarks can be identified. For example, the model can recognize recurrent patterns of language that stereotype certain demographic groups or perpetuate negative stereotypes. By detecting such patterns, the model can flag instances of biased content and contribute to the mitigation of discriminatory behavior in AI-generated responses. For example, if there is a trend where rejected applications often mention factors like "credit score" or "employment history" in a negative context in the explanation of the training dataset, implying bias against individuals with less favorable financial backgrounds, whereas approved applications consistently highlight positive attributes like "steady income" or "strong credit history," the patterns can reveal biases in the AI model's decision-making process.

The system can segment the alphanumeric characters of the set of responses generated by an AI model into individual tokens or units of meaning. For example, words, phrases, or punctuation marks can be identified as distinct tokens within the responses. By tokenizing the alphanumeric characters, the system creates a structured representation of the textual data, allowing for subsequent analysis and feature extraction. The responses can be normalized by, for example, stripping suffixes or prefixes from words to derive the words'base or root forms, or map words to corresponding canonical or dictionary forms. The techniques help standardize the representation of words within the responses, reducing redundancy and improving the efficiency of pattern detection.

In operation 1206, using the trained ML model, the system constructs a set of validation actions associated with certain patterns. Each validation action maps to a specific scenario derived from certain patterns and tests the existence of certain patterns within the result and/or the set of descriptors of the AI model. Each validation action includes (1) a command set, (2) an expected result, and (3) an expected set of descriptors associated with an expected series of steps to generate the expected result. Example methods of identifying relevant validation actions from previously stored validation actions are discussed further in FIG. 15. In some implementations, the platform ML model does not categorize identified biases or distinguish between different types of biases (e.g., training bias, algorithmic bias, cognitive bias). Rather, patterns (e.g., frequency-related, syntactic, linguistic) that are identified through the validation actions are flagged as potential bias. Methods of validating the AI-generated responses against the guidelines (e.g., vector constraints 802) by creating validation actions are discussed in further detail in FIGS. 8, 16, and 14.

The system can define a command set tailored to elicit responses from the AI model that encapsulates the presence or absence of the identified alphanumeric character patterns in operation 1204. For example, if a pattern indicative of biased language is detected in the training dataset (e.g., if all approved loan applications state "He has strong financial credentials," and never "She has strong financial credentials"), a corresponding command set can prompt the AI model to generate a response that either exhibits or lacks the specific linguistic bias (e.g., "Generate an indicator of the strength of the applicant's financial credentials using gender-specific language"). The command set serves as a standardized instruction guiding the AI model's behavior during the validation process. The identified certain patterns can be decomposed into the patterns'constituent elements, whether the patterns are alphanumeric characters, words, phrases, or structural features. For certain patterns that follow predictable rules or templates, a rule-based approach can be employed to generate command sets automatically. Rules are defined based on the observed patterns, and commands are generated programmatically according to the rules. For example, if a bias pattern involves specific keyword combinations, rules can be defined to generate commands containing the keywords in various contexts.

Command sets can be generated adaptively based on feedback from previous testing iterations. Machine learning algorithms can analyze the effectiveness of previous commands and adjust the generation process dynamically to optimize testing efficiency and accuracy. For example, commands that consistently yield informative responses can be prioritized, while less effective commands can be refined or replaced. The adaptive approach ensures that the command sets evolve over time to effectively capture and test against emerging patterns or variations in the data.

In some implementations, the ML model generates a confidence score associated with a likelihood of the existence of the certain patterns within the set of responses generated by the AI model. The confidence score is represented as an alphanumeric value ranging from 0 to 1, where higher values indicate a higher likelihood of the identified patterns being present in the responses. The ML model can output a binary indicator, represented by alphanumeric characters such as "0" or "1", where "1" signifies the presence of certain patterns with high confidence, and "0" indicates an absence or uncertainty. The system can express the confidence score as a categorical variable, using alphanumeric labels such as "low", "medium", or "high" to indicate different levels of confidence in the existence of the identified patterns. The ML model can produce a probabilistic distribution over multiple classes or categories, represented by alphanumeric characters corresponding to the probabilities assigned to each class. For example, a confidence score of "0.8" can signify an 80% probability of certain patterns being present, while "0.2" indicates a 20% probability.

In some implementations, the ML model can identify new patterns within the result and/or the set of descriptors of the AI model, and iteratively update the set of validation actions based on the new patterns. Once new patterns are identified, the ML model can evaluate the significance and relevance to the validation process. The ML model determines whether the patterns necessitate the creation of new validation actions or modifications to existing ones. The update to the validation actions can involve creating new validation actions tailored to address specific patterns or refining existing actions to better capture the nuances of the identified patterns. The iterative process continues as the ML model periodically reviews the outcome and descriptors of the AI model to identify additional patterns and refine the validation actions accordingly. By iteratively updating the set of validation actions, the ML model ensures that the validation process remains dynamic and responsive to the evolving characteristics of the AI model's responses.

In some implementations, the ML model receives an indicator of a type of application associated with the AI model. The ML model, or another intermediate AI model, can identify a relevant set of attributes associated with the type of application defining the operation boundaries of the AI model. To identify a relevant set of attributes associated with the type of application, the ML model can use techniques tailored to the unique characteristics of the application domain or rely on pre-defined sets of attributes curated for different types of applications (e.g., through industry standards). The ML model can obtain the relevant set of attributes via an Application Programming Interface (API) based on the type of application of the AI model. For example, in an AI model designed to assess loan applications. In the scenario, the ML model can use an Application Programming Interface (API) provided by financial institutions or credit bureaus and access a relevant set of attributes typically associated with loan applications, such as income, employment status, credit history, debt-to-income ratio, and loan amount requested. In some implementations, rather than relying solely on an API, the ML model can utilize web scraping techniques to extract attribute data from online sources such as databases, websites, or other repositories.

Figure 13:
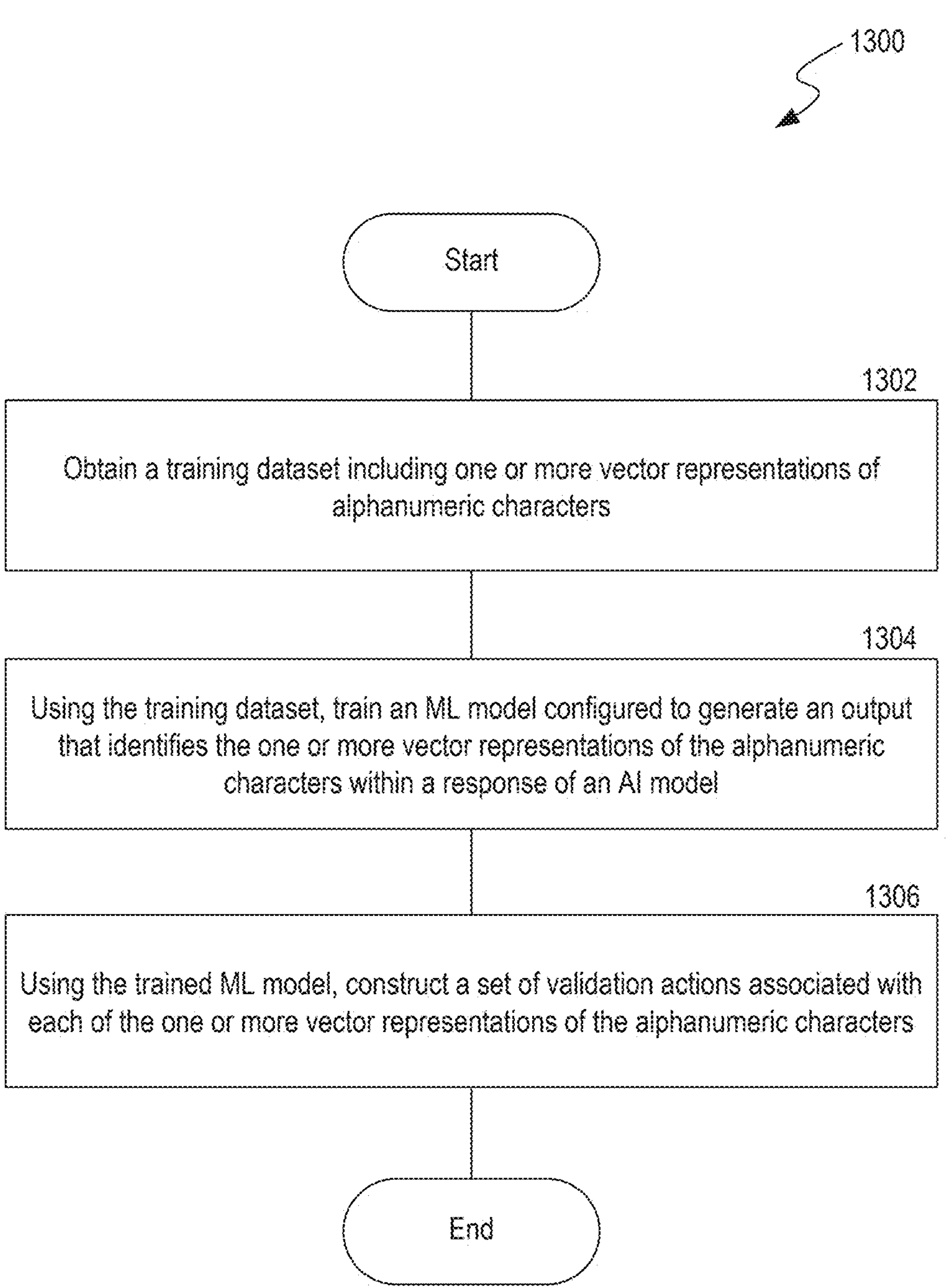
FIG. 13 is a flowchart depicting an example method of detecting vector representations within an output of an AI model, in accordance with some implementations of the present technology.

FIG. 13 is a flowchart depicting an example method 1300 of detecting vector representations within an output of an AI model, in accordance with some implementations of the present technology. In some implementations, the process is performed by a computer system, e.g., example computer system 1700 illustrated and described in more detail with reference to FIG. 17. Particular entities, for example, AI application 806, 1008 are illustrated and described in more detail with reference to FIGS. 8 and 10. Likewise, implementations can include different and/or additional steps or can perform the steps in different orders.

In operation 1302, the system obtains a training dataset including vector representations of alphanumeric characters. The vector representations can encode the alphanumeric characters into numerical format, allowing the system to process and analyze the vector representations using mathematical operations. To create vector representations of alphanumeric characters, the system can map each alphanumeric character to a dense vector space where semantic similarities between characters are preserved. By leveraging the context of neighboring characters, embeddings capture nuanced relationships between alphanumeric characters. For example, the alphanumeric characters are encoded into vectors using word embeddings. Word embeddings, such as Word2Vec or GloVe, learn vector representations of words based on the word's contextual usage in a large corpus of text data. Each word is represented by a vector in a high-dimensional space, where similar words have similar vector representations.

In some implementations, character-level embeddings designed for alphanumeric characters can be used to focus on the characters themselves rather than entire words for short text sequences. To create character-level embeddings, the system can assign a unique vector to each alphanumeric character in the training dataset. Convolutional neural networks (CNNs) or recurrent neural networks (RNNs) can be used, where CNN-based approaches apply a series of convolutional filters over the input characters to extract local features, while RNNs process the characters sequentially to capture contextual information. Both architectures can effectively learn representations of individual characters based on the surrounding context. Character-level embeddings can also incorporate subword information, such as character n-grams (e.g., a sequence of n-words) or morphemes (e.g., the smallest meaningful constituent of a linguistic expression, such as "un," "break," "able" for the word "unbreakable"). By considering the smaller units of text, the embeddings can capture more complex linguistic patterns and improve performance, especially for tasks involving rare or out-of-vocabulary words.

In some implementations, the training data is labeled data. Further discussion of labeled training data is detailed with reference to FIG. 12. For example, a labeled dataset for toxic language detection can include comments from social media platforms or online forums, where each comment, word, and/or phrase is annotated as either "toxic" or "non-toxic" based on its content. In some implementations, the training data is unlabeled data. Unlabeled data lacks explicit annotations and requires the model to infer patterns and structures independently. For example, unlabeled data can include website articles, blog posts, or customer reviews, without any guidance on whether the content is toxic or harmful. For data privacy reasons, synthetic data can be generated and used as the training dataset. Further discussion of generating synthetic data is detailed with reference to FIG. 12.

In operation 1304, using the training dataset, the system trains an ML model to generate an output that identifies the vector representations of the alphanumeric characters within a response of an AI model. The AI model, in response to a command set, generates the set of responses including a result (e.g., an outcome) and a set of descriptors associated with a series of steps to generate the result (e.g., an explanation). Examples of the AI model's responses are further discussed with reference to FIG. 8.

To train the ML model, neural network architectures such as convolutional neural networks (CNNs) or recurrent neural networks (RNNs) can be used to process sequences of the training data received in operation 1302. During the training process, the ML model adjusts its parameters iteratively to minimize the discrepancy between the predicted vector representations and the ground truth representations provided by the training dataset. Further discussion of Artificial Intelligence and training methods for both labeled data and unlabeled data are discussed in FIGS. 12 and 16. Certain alphanumeric characters or combinations of characters can exhibit higher frequencies in responses containing toxic and/or harmful language compared to non-toxic and/or non-harmful responses. For example, profanity or derogatory terms can appear more frequently in toxic responses, so the ML model can flag AI model responses containing the certain alphanumeric characters or combinations of characters as harmful.

Once the ML model is trained, the model can receive responses generated by the AI model in response to a given command set. The responses of the AI model can contain alphanumeric characters, and the ML model can identify the vector representations associated with each character within the response. By evaluating the vector representations of alphanumeric characters from the response, the system can detect patterns associated with toxic language.

To identify the vector representations, the system can evaluate the proximate locations of the alphanumeric characters within the response of the AI model. To evaluate the proximate locations of alphanumeric characters within the response of the AI model, the system can use tokenization and/or positional encoding. The response from the AI model can be tokenized into individual alphanumeric characters, each character as a discrete unit in the sequence. The characters are encoded into vector representations in methods described further in this figure with reference to the training dataset. Once the response is tokenized and encoded into vector representations, the system can analyze the vectors to evaluate the proximate locations of alphanumeric characters. Evaluating the proximate location allows the model to discern the proximity of characters in the sequence and learn contextual relationships between neighboring characters. For example, the system can calculate pairwise distances between vectors or measure similarity scores based on vector representations. By considering the distances or similarities between vectors, the system can infer the spatial relationships and proximities between characters within the sequence. The ML model can compute the distance between every pair of vectors in the dataset. Various distance metrics can be used, such as Euclidean distance, Manhattan distance, or cosine similarity. Euclidean distance measures the straight-line distance between two points in the vector space, while Manhattan distance calculates the distance along the axes. Cosine similarity measures the cosine of the angle between two vectors, indicating the similarity in the vectors' directions. In some implementations, the ML model uses temporal dependencies between the alphanumeric characters to evaluate the proximate locations of the alphanumeric characters within the response of the AI model by considering the order and timing of the appearance of the alphanumeric characters within the response.

To identify the vector representations, the system can evaluate the frequency of the alphanumeric characters within the response of the AI model. Term Frequency-Inverse Document Frequency (TF-IDF) encoding calculates the importance of a word relative to the word's frequency in the entire training dataset. For example, if the response contains the alphanumeric characters "abcdeabc", the system counts the occurrences of each character: 'a' appears twice, 'b' appears twice, 'c' appears twice, 'd' appears once, and 'e' appears once. The system can assign specific weights to words that are more indicative of harmful language (e.g., profanity). Assigning weights prioritizes the importance of the characters in the vector representations, enabling the system to prioritize identifying toxic and/or harmful language based on the presence and frequency of the characters.

To identify the vector representations, the system can evaluate an association between the alphanumeric characters within the response of the AI model. Alphanumeric characters that commonly appear in toxic responses can exhibit distinct patterns in the characters' vector representations with other vector representations compared to non-toxic responses. For example, in the vector space, certain alphanumeric characters associated with toxic language can cluster together, forming distinct regions that differentiate the clusters from characters in non-toxic responses. The clusters can reflect semantic relationships or contextual associations specific to toxic language usage. By evaluating the spatial arrangement of vector representations, the system can identify the patterns and use them as indicators to classify responses as toxic or non-toxic.

In operation 1306, using the trained ML model, the system constructs a set of validation actions associated with each of the vector representations of the alphanumeric characters. Each validation action tests the presence or absence of the vector representations of the alphanumeric characters within the result and/or the set of descriptors of the AI model. Each validation action maps to a specific use-case derived from the vector representations of the alphanumeric characters. Each validation action includes (1) a command set, (2) an expected result, and (3) an expected set of descriptors associated with an expected series of steps to generate the expected result. Example methods of identifying relevant validation actions from previously stored validation actions are discussed further in FIG. 15.

For example, the system can establish thresholds for certain attributes or features extracted from the vector representations, such as the magnitude or direction of the vectors. If a vector representation exceeds or falls below a predefined threshold (e.g., indicating harmful language), the system can trigger specific validation actions to address non-compliance. In some implementations, the system can classify the vector representations into different categories or classes (e.g., "profanity," "hate speech," "harassment") that map to different validation actions. Based on the classification results, the system can assign appropriate validation actions to each category of vector representations. For example, the system can use clustering to group similar vector representations together. Clustering algorithms can identify clusters of vector representations that share common characteristics or patterns, allowing the system to define validation actions tailored to each cluster.

In some implementations, the set of validation actions constructed by the trained ML model is ordered based on the complexity of the use-cases derived from the vector representations of the alphanumeric characters. For example, subsequently constructed validation actions are progressively more complex than preceding validation actions. The validation actions can be ordered by analyzing the vector representations of the alphanumeric characters and identifying the underlying complexity of each representation. Certain representations can capture simple patterns or straightforward use-cases, while others can involve more intricate relationships or dependencies between characters. For example, simpler validation actions can focus on detecting explicit keywords or phrases commonly associated with toxicity (e.g., profanity). On the other hand, more complex validation actions (e.g., harassment) can involve analyzing the context in which certain words or phrases appear and identifying subtle nuances that contribute to the overall toxicity of the language. For example, the system can consider the tone, intent, and underlying sentiment of the response to determine whether the response contains toxic elements. The system can assign a complexity score to each validation action, enabling the system to order the validation actions in a logical sequence.

In some implementations, the ML model weighs the identified vector representations of the alphanumeric characters within the response of the AI model based on predetermined weights corresponding with each of the identified vector representations of the alphanumeric characters. The output can include an overall score in accordance with the weighted vector representations of the alphanumeric characters. The system can use a threshold mechanism to determine whether the overall score indicates the presence or absence of certain characteristics or patterns (e.g., toxicity) within the response. For example, if the score exceeds a predefined threshold, the system can classify the response accordingly. There can be multiple thresholds corresponding to different compliance indicators. For example, there can be a threshold for "compliant," "partially compliant," and "non-compliant."

Figure 14:
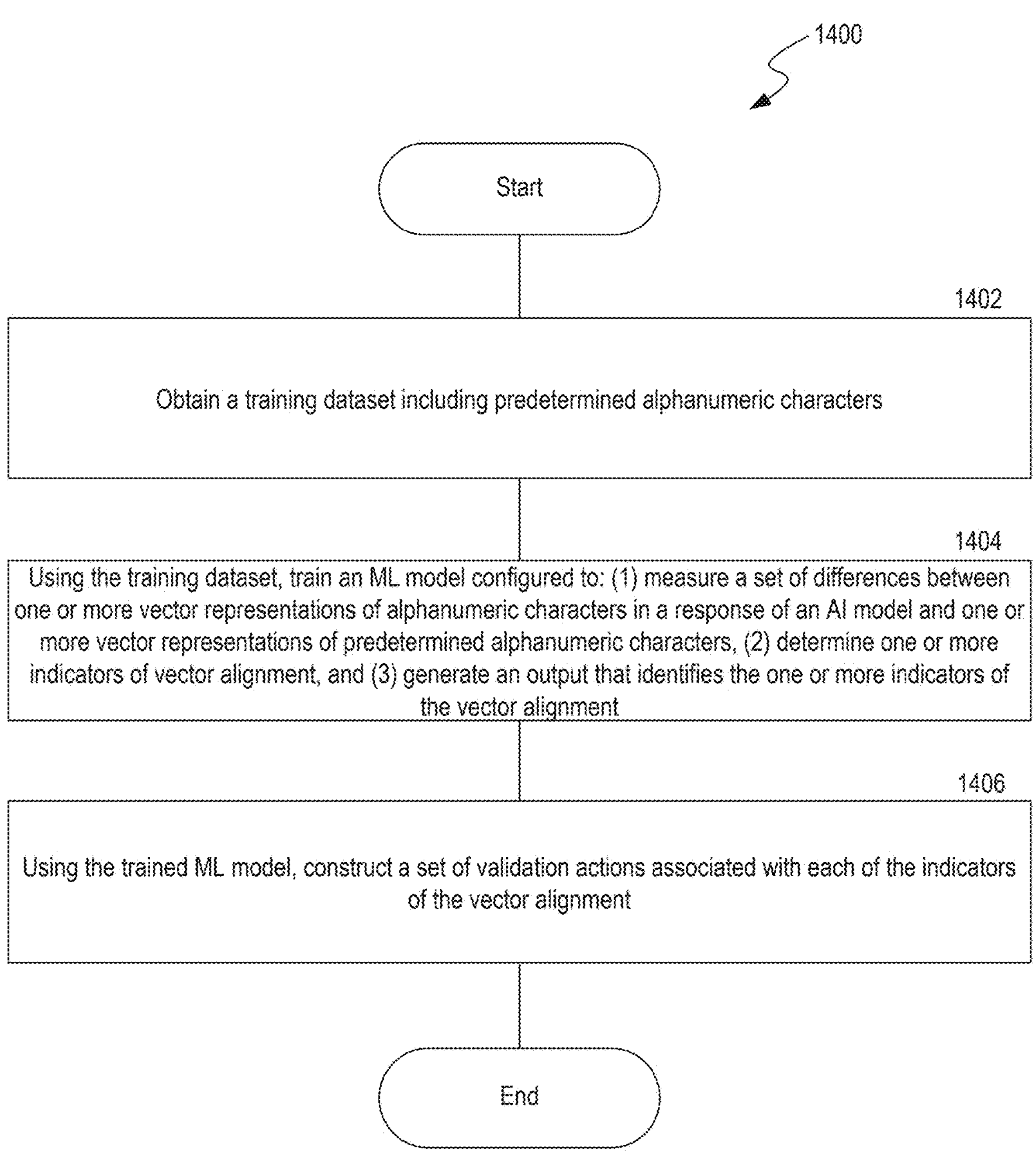
FIG. 14 is a flowchart depicting an example method of detecting indicators of vector alignment within an output of an AI model, in accordance with some implementations of the present technology.

FIG. 14 is a flowchart depicting an example method 1400 of detecting indicators of vector alignment within an output of an AI model, in accordance with some implementations of the present technology. In some implementations, the process is performed by a computer system, e.g., example computer system 1700 illustrated and described in more detail with reference to FIG. 17. Particular entities, for example, AI application 806, 1008 are illustrated and described in more detail with reference to FIGS. 8 and 10. Likewise, implementations can include different and/or additional steps or can perform the steps in different orders.

In operation 1402, the system obtains a training dataset including predetermined alphanumeric characters. The dataset can be indicative of IP violations, such as copyrighted text and/or trademarked text commonly associated with intellectual property infringement. The training dataset can be a list of IP-protected text obtained from authoritative sources, legal databases, or intellectual property registries. The training dataset can include copyrighted excerpts from literary works, trademarked slogans or logos, patented phrases, or other textual content with recognized intellectual property rights. The training dataset can be constructed by scraping publicly available sources, such as websites, online marketplaces, or social media platforms, where instances of IP violations are frequently observed. Web scraping tools can be employed to extract alphanumeric text from the sources, filtering for content that matches known IP-protected text.

In some implementations, the predetermined alphanumeric characters can be encoded into vector representations. Further discussion of encoding alphanumeric characters into vector representations is detailed with reference to FIG. 13.

In some implementations, the training data is labeled data. Further discussion of labeled training data is detailed with reference to FIG. 12. For example, a labeled dataset for IP violation detection can include words or phrases labeled as either "IP infringement" or "non-infringing" based on the presence or absence of copyrighted and/or trademarked content. In some implementations, the training data is unlabeled data. Unlabeled data lacks explicit annotations and requires the model to infer patterns and structures independently. For example, unlabeled data can include text data, but without explicit annotations indicating which descriptions include copyrighted text and/or trademarked terms or logos. For data privacy reasons, synthetic data can be generated and used as the training dataset. Further discussion of generating synthetic data is detailed with reference to FIG. 12.

In operation 1404, using the training dataset, the system trains an ML model. The ML model can be trained to measure a set of differences in the direction or magnitude between vector representations of alphanumeric characters in a response of an AI model and vector representations of predetermined alphanumeric characters. Further discussion of Artificial Intelligence and training methods are discussed in FIG. 16. The AI model, in response to a command set, generates the set of responses including a result (e.g., an outcome) and a set of descriptors associated with a series of steps to generate the result (e.g., an explanation). Examples of the AI model's responses are further discussed with reference to FIG. 8. The ML model can be trained to generate an output that identifies the indicators of the vector alignment associated with the vector representations of the alphanumeric characters within the response of the AI model.

To measure differences in the direction or magnitude between vector representations of alphanumeric characters, the ML model can calculate the angular and/or distance disparities between the vectors associated with the alphanumeric characters present in the response generated by the AI model and those predefined in the training dataset. The ML model can compute the cosine similarity or cosine distance between the vector representations. Cosine similarity measures the cosine of the angle between two vectors and provides a value ranging from −1 to 1, where a higher value indicates greater similarity. Conversely, cosine distance quantifies the dissimilarity by subtracting the cosine similarity from 1, yielding a range from 0 to 2, where lower values indicate closer alignment. The greater the similarity, the more likely the AI model's response is infringing on IP rights. Additionally, the model can compute Euclidean distance or other distance metrics to evaluate the spatial separation between vector representations. Euclidean distance measures the straight-line distance between two vectors in multidimensional space, providing a scalar value representing the length of the shortest path between the vectors. By comparing the Euclidean distances between the vectors in the response and the predetermined set, the ML model identifies discrepancies in both direction and magnitude. The lower the discrepancy, the more likely the AI model's response is infringing on IP rights.

The ML model can be trained to determine indicators of vector alignment based on whether a volume of the set of differences between vector representations of alphanumeric characters in a response of an AI model and vector representations of predetermined alphanumeric characters satisfies a predetermined threshold. The volume represents the overall magnitude or extent of misalignment between the vectors. The ML model can compute the differences in direction or magnitude for each pair of corresponding vectors in the response and the predetermined set and aggregate the differences to determine the volume. In some implementations, the ML model can evaluate the average or total magnitude of differences across all vectors, providing a comprehensive measure of alignment across the entire response. By aggregating the individual discrepancies, the model gains insights into the overall alignment patterns present in the response. In some implementations, the ML model establishes a predetermined threshold to classify alignment indicators. The threshold serves as a reference point for determining whether the observed volume of differences exceeds an acceptable level. If the calculated volume surpasses the threshold, the model identifies the presence or absence of misalignment and flags the response as an indicator of potential issues or deviations. The ML model can adaptively adjust the threshold based on historical data or feedback from previous analyses.

In some implementations, the response includes unstructured alphanumeric characters. The ML model can extract the predetermined alphanumeric characters from the unstructured alphanumeric characters by identifying and isolating the predetermined alphanumeric characters from surrounding unstructured alphanumeric characters. For example, if the ML model is looking for specific alphanumeric sequences representing trademarked phrases, the ML model can search for exact matches of those sequences within the unstructured data.

In operation 1406, using the trained ML model, the system constructs a set of validation actions associated with each of the indicators of the vector alignment. Each validation action maps to a specific use-case derived from the indicators of the vector alignment and tests the presence or absence of the indicators of the vector alignment within the result and/or the set of descriptors of the AI model. Each validation action includes (1) a command set, (2) an expected result, and (3) an expected set of descriptors associated with an expected series of steps to generate the expected result. Example methods of identifying relevant validation actions from previously stored validation actions are discussed further in FIG. 15.

In some implementations, the validation actions are defined based on the presence or absence of certain alignment indicators within the vector representations of alphanumeric characters that are indicative of IP-protected content. For example, certain patterns or characteristics in the vector representations can strongly correlate with copyrighted text or trademarked phrases commonly associated with IP violations. The system can design validation actions to test for the presence or absence of the patterns in the responses generated by the AI model. In some implementations, the system can use a probabilistic approach, where the ML model assigns likelihood scores to different alignment indicators based on the observed frequency and significance in relation to IP infringement. Validation actions can be tailored to test for the presence or absence of alignment indicators with high likelihood scores, indicating a higher probability of IP violation. The system can consider the complexity and diversity of alignment indicators identified by the ML model in relation to IP infringement. For example, if the ML model identifies multiple types of alignment indicators associated with different forms of IP violations (e.g., copyrighted text, trademarked phrases), the system can prioritize validation actions based on the relative importance of the indicators in detecting IP infringement.

In some implementations, the set of validation actions constructed by the trained ML model is categorized based on a type of indicator of vector alignment. The type of the indicator of the vector alignment can include complete alignment, partial alignment, and/or misalignment. For example, if the ML model identifies vector representations that closely match known instances of copyrighted text or trademarked phrases, the alignment indicators can be classified as indicating complete alignment with IP-protected content. Alternatively, the system can categorize alignment indicators as representing partial alignment if the vector representations exhibit some similarities or overlaps with patterns associated with IP infringement but do not fully match predefined criteria for complete alignment. For example, if certain vector representations display similarities with copyrighted text but also contain variations or deviations, the vector representations can be classified as indicating partial alignment with IP-protected content. The system can identify alignment indicators that deviate significantly from predetermined patterns or characteristics associated with IP infringement, indicating misalignment with IP-protected content. For example, if the ML model detects vector representations that diverge substantially from known instances of copyrighted text or trademarked phrases, the alignment indicators can be categorized as indicating misalignment with IP-protected content. In some implementations, complete alignment indicators can be prioritized in validation actions aimed at identifying clear-cut instances of IP violation, while partial alignment and misalignment indicators can be targeted in cases where the boundaries between infringing and non-infringing content are less clear.

In some implementations, the system can evaluate (1) the proximate locations of the alphanumeric characters within the response of the AI model, (2) the frequency of the alphanumeric characters within the response of the AI model, and/or (3) an association between the alphanumeric characters within the response of the AI model. Further evaluation techniques are discussed with reference to FIG. 13.

The system can receive an indicator of a type of application associated with the AI model. The system identifies a relevant set of predetermined alphanumeric characters associated with the type of application defining one or more operation boundaries of the AI model. The system can obtain the relevant set of predetermined alphanumeric characters via an Application Programming Interface (API). Further methods of defining a type of application of the AI model are discussed with reference to FIG. 12.

Figure 15:
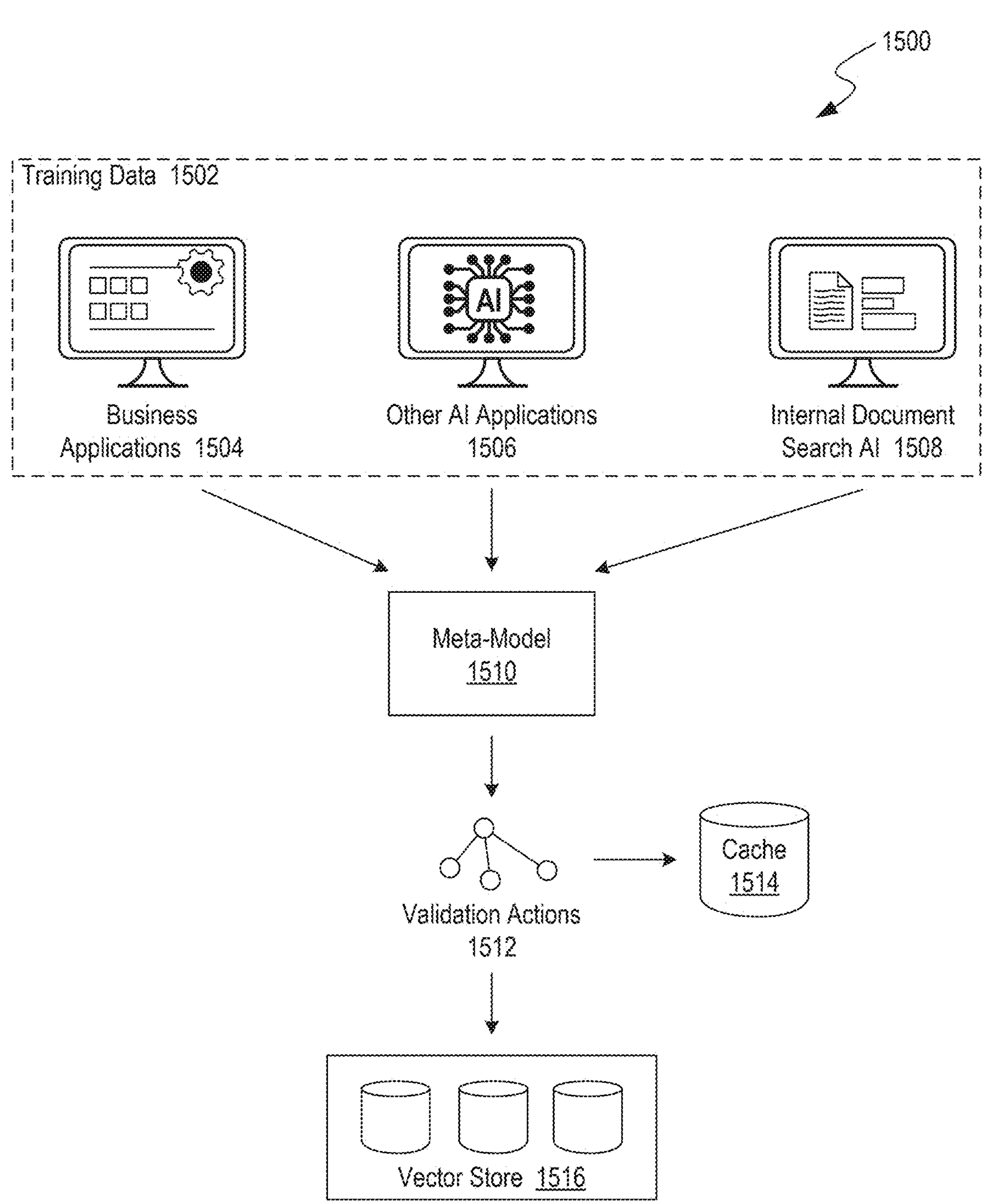
FIG. 15 is a block diagram illustrating an example environment for generating validation actions to determine AI model compliance, in accordance with some implementations of the present technology.

FIG. 15 is a block diagram illustrating an example environment 1500 for generating validation actions to determine AI model compliance, in accordance with some implementations of the present technology. Environment 1500 includes training data 1502, meta-model 1510, validation actions 1512, cache 1514, and vector store 1516. Meta-model 1510 is the same as or similar to meta-model 1102 illustrated and described in more detail with reference to FIG. 11. Meta-model 1510 is implemented using components of example computer system 1700 illustrated and described in more detail with reference to FIG. 17 and/or the validation engine 804 and validation engine 912 illustrated and described in more detail with reference to FIGS. 8 and 9 respectively. Likewise, implementations of example environment 1500 can include different and/or additional components or can be connected in different ways.

The training data includes data from sources such as business applications 1504, other AI applications 1506, and/or an internal document search AI 1508. Business applications 1504 refer to software tools or systems used to facilitate various aspects of business operations and can include data related to, for example, loan transaction history, customer financial profiles, credit scores, and income verification documents. For example, data from a banking application can provide insights into an applicant's banking behavior, such as average account balance, transaction frequency, and bill payment history. Other AI applications 1506 can include, for example, credit scoring models, fraud detection algorithms, and risk assessment systems that can be used by lenders to evaluate loan applications. Data from AI applications 1506 refer to various software systems that utilize artificial intelligence (AI) techniques to perform specific tasks or functions. The data can include credit risk scores and fraud risk indicators. For example, an AI-powered credit scoring model can provide a risk assessment score based on an applicant's credit history, debt-to-income ratio, and other financial factors. The internal document search AI 1508 is an AI system tailored for searching and retrieving information from internal documents within an organization. For example, the internal document search AI 1508 can be used to retrieve and analyze relevant documents such as loan agreements, regulatory compliance documents, and internal policies. Data from internal documents can include, for example, legal disclosures, loan terms and conditions, and compliance guidelines. For example, the AI system can flag loan applications that contain discrepancies or inconsistencies with regulatory guidelines or internal policies.

The training data 1502 is fed into the meta-model 1510 to train the meta-model 1510, enabling the meta-model 1510 to learn patterns and characteristics associated with compliant and non-compliant AI behavior. Further discussion of Artificial Intelligence and training methods are discussed in FIGS. 12-7 and FIG. 16. The meta-model 1510 leverages the learned patterns and characteristics to generate validation actions 1512, which serve as potential use-cases designed to evaluate AI model compliance. The validation actions 1512 can encompass various scenarios and use cases relevant to the specific application domain of the AI model under assessment. Further methods of creating validation actions are discussed in FIGS. 12-7.

In some implementations, the generated validation actions 1512 can be stored in a cache 1514 and/or a vector store 1516. The cache 1514 is a temporary storage mechanism for storing recently accessed or frequently used validation actions, and facilitates efficient retrieval when needed. On the other hand, the vector store 1516 provides a structured repository for storing vector representations of validation actions, enabling efficient storage and retrieval based on similarity or other criteria. The vector store 1516 stores the generated validation actions 1512 in a structured and accessible format (e.g., using distributed databases or NoSQL stores), which allows for efficient retrieval and utilization by the meta-model 1510. The generated validation actions 1512 can be preprocessed to remove any irrelevant information, standardize the format, and/or organize the generated validation actions 1512 into a structured database schema. Once the generated validation actions 1512 are prepared, the generated validation actions 1512 can be stored in a vector store 1516 using distributed databases or NoSQL stores.

In some implementations, the generated validation actions 1512 are stored using graph databases such as Neo4j™ or Amazon Neptune™. Graph databases represent data as nodes and edges, allowing for the modeling of relationships between generated validation actions 1512 to demonstrate the interdependencies. In some implementations, the generated validation actions 1512 are stored in a distributed file system such as Apache Hadoop™ or Google Cloud Storage™. The systems offer scalable storage for large volumes of data and support parallel processing and distributed computing. Generated validation actions 1512 stored in a distributed file system can be accessed and processed by multiple nodes simultaneously, which allows for faster retrieval and analysis by the meta-model 1510.

The vector store 1516 can be stored in a cloud environment hosted by a cloud provider, or a self-hosted environment. In a cloud environment, the vector store 1516 has the scalability of cloud services provided by platforms (e.g., AWS™, Azure™). Storing the vector store 1516 in a cloud environment entails selecting the cloud service, provisioning resources dynamically through the provider's interface or APIs, and configuring networking components for secure communication. Cloud environments allow the vector store 1516 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 1516 is stored on a private web server. Deploying the vector store 1516 in a self-hosted environment entails setting up the server with the necessary hardware or virtual machines, installing an operating system, and storing the vector store 1516. In a self-hosted environment, organizations have full control over the vector store 1516, allowing organizations to implement customized security measures and compliance policies tailored to the organization's specific needs. For example, organizations in industries with strict data privacy and security regulations, such as finance institutions, can mitigate security risks by storing the vector store 1516 in a self-hosted environment.

The meta-model 1510 accesses the generated validation actions 1512 from the vector store 1516 to initiate the compliance assessment. The system can establish a connection to the vector store 1516 using appropriate APIs or database drivers. The connection allows the meta-model 1510 to query the vector store 1516 and retrieve the relevant vector constraints for the AI application under evaluation. Frequently accessed validation actions 1512 are stored in memory, which allows the system to reduce latency and improve response times for compliance assessment tasks.

In some implementations, only the relevant validation actions are retrieved based on the specific AI application under evaluation. For example, metadata tags, categories, or keywords associated with the AI application can be used to filter the validation actions 1512. The relevant validation actions can be specifically selected based on the specific context and requirements of the AI application being evaluated. For example, the system analyzes metadata tags, keywords, or categories associated with the validation actions 1512 stored in the system's database. Using the specific context and requirements of the AI application, the system filters and retrieves the relevant validation actions from the database.

Various filters can be used to select relevant validation actions. In some implementations, the system uses natural language processing (NLP) to parse through the text of the validation action 1512 and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant validation actions. To identify the relevant validation actions from the validation actions 1512, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant validation actions with attributes that help contextualize the relevant validation actions. The tags serve as markers that categorize and organize the validation actions 1512 based on predefined criteria, such as regulatory topics (e.g., data privacy, fairness, transparency) or jurisdictional relevance (e.g., regional regulations, industry standards). The tags provide a structured representation of the validation actions 1512 and allow for easier retrieval, manipulation, and analysis of regulatory content. The tags and associated metadata can be stored in a structured format, such as a database, where each validation action 1512 is linked to the validation action's 1512 corresponding tags and/or regulatory provisions.

The meta-model 1510 evaluates the AI application's compliance with the vector constraints through the use of validation actions 1512 (e.g., using semantic search, pattern recognition, and machine learning techniques). Further evaluation methods in determining compliance of AI applications are discussed with reference to FIGS. 12-7.

Figure 16:
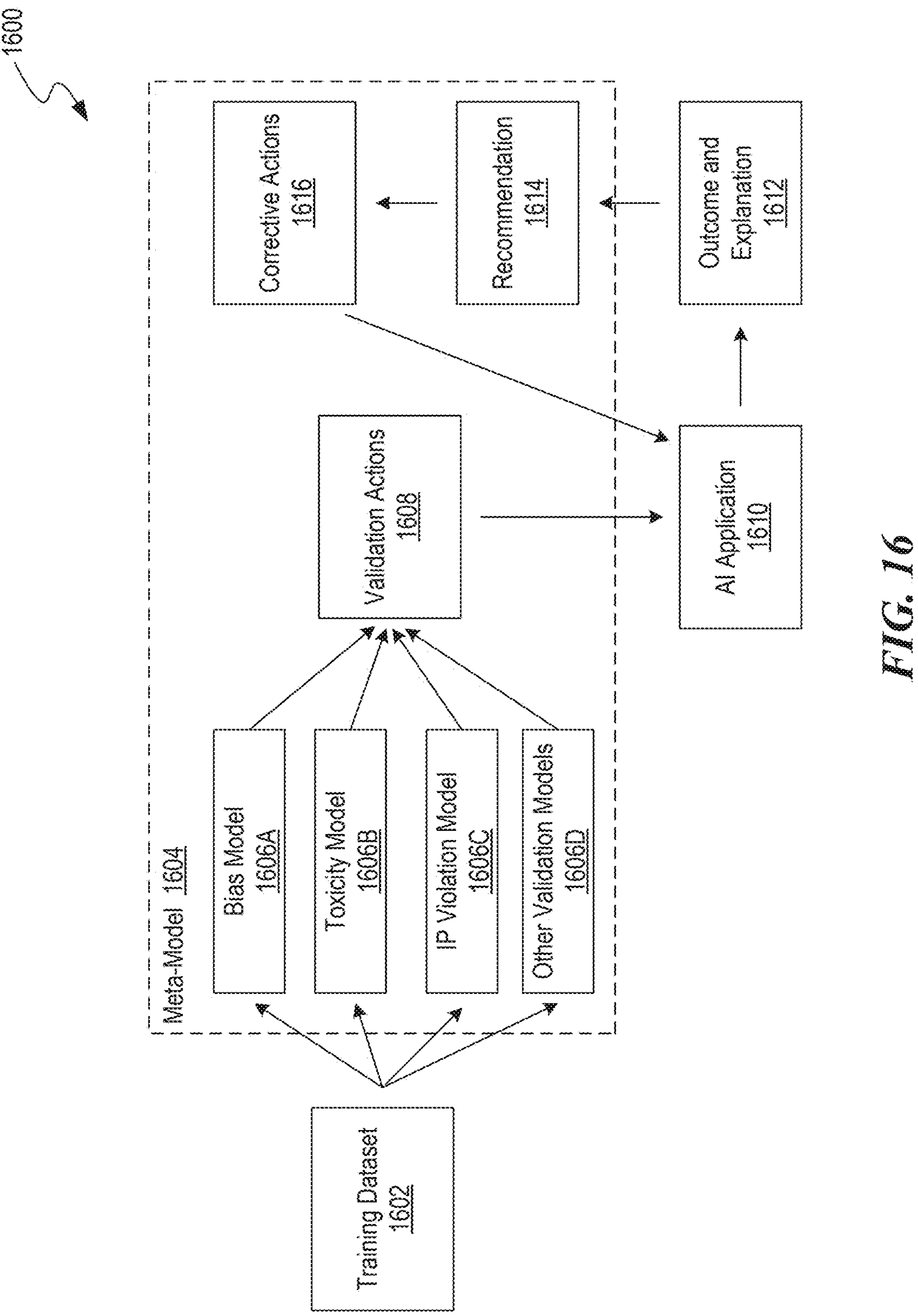
FIG. 16 is a block diagram illustrating an example environment for automatically implementing corrective actions on the AI model, in accordance with some implementations of the present technology.

FIG. 16 is a block diagram illustrating an example environment 1600 for automatically implementing corrective actions on the AI model, in accordance with some implementations of the present technology. Environment 1600 includes training dataset 1602, meta-model 1604 (which includes validation models 1606A-D, validation actions 1608, AI application 1610), outcome and explanation 1612, recommendation 1614, and corrective actions 1616. Meta-model 1604 is the same as or similar to meta-model 1102 and meta-model 1510 illustrated and described in more detail with reference to FIGS. 11 and 11, respectively. Meta-model 1604 and AI application 1610 are implemented using components of example computer system 1700 illustrated and described in more detail with reference to FIG. 17. Likewise, implementations of example environment 1600 can include different and/or additional components or can be connected in different ways.

A training dataset 1602, which includes a collection of data used to train machine learning models, is input into the meta-model 1604. The meta-model 1604 is a comprehensive model that encompasses multiple sub-models tailored to address specific aspects of AI compliance. Further evaluation techniques in determining the training dataset for the meta-model 1604 are discussed with reference to FIGS. 12-7. Within the meta-model 1604, various specialized models are included, such as a bias model 1606A (described in further detail with reference to FIG. 12), a toxicity model 1606B (described in further detail with reference to FIG. 13), an IP violation model 1606C (described in further detail with reference to FIG. 14), and other validation models 1606D. Each of the models is responsible for detecting and assessing specific types of non-compliant content within AI models. Upon processing the training dataset 1602, each model generates validation actions tailored to evaluate the presence or absence of specific types of non-compliant content. Further evaluation techniques in generating validation actions using the meta-model 1604 are discussed with reference to FIGS. 12-8.

The set of generated validation actions 1608 is provided as input to an AI application 1610 in the form of a prompt. The AI application 1610 processes the validation actions 1608 and produces an outcome along with an explanation 1612 detailing how the outcome was determined. Subsequently, based on the outcome and explanation 1612 provided by the AI application 1610, the system can generate recommendations 1614 for corrective actions. The recommendations are derived from the analysis of the validation action outcomes and aim to address any identified issues or deficiencies. For example, if certain validation actions fail to meet the desired criteria due to specific attribute values or patterns, the recommendations can suggest adjustments to those attributes or modifications to the underlying processes.

For a bias detection model, such as the ML model discussed in FIG. 12, if certain attributes exhibit unexpected associations or distributions, the system can retrain the tested AI model with revised weighting schemes to better align with the desired vector constraints. In a toxicity model, such as the ML model discussed in FIG. 13, the corrective actions can include implementing post-processing techniques in the tested AI model to filter out responses that violate the vector constraints (e.g., filtering out responses that include the identified vector representations of the alphanumeric characters). Similarly, in an IP rights violation model, such as the ML model discussed in FIG. 14, the corrective actions can include implementing post-processing techniques in the tested AI model to filter out responses that violate the IP rights (e.g., filtering out responses including the predetermined alphanumeric characters).

In some implementations, based on the outcomes and explanations, the system applies predefined rules or logic to determine appropriate corrective actions. The rules can be established by users and can consider factors such as regulatory compliance, risk assessment, and business objectives. For example, if an application is rejected due to insufficient income, the system can recommend requesting additional financial documentation from the applicant.

In some implementations, the system can use machine learning models to generate recommendations. The models learn from historical data and past decisions to identify patterns and trends that indicate a set of actions the AI model can take to comply with the vector constraints. By training on a dataset of past corrective actions and the outcomes, the machine learning models can predict the most effective recommendations for new cases. Further discussion of Artificial Intelligence and training methods are discussed in FIG. 16. The recommendations 1614 can be automatically implemented as corrective actions 1616 by the system. The automated approach streamlines the process of addressing identified issues and ensures swift remediation of non-compliant content within AI models, enhancing overall compliance and reliability.

Figure 17:
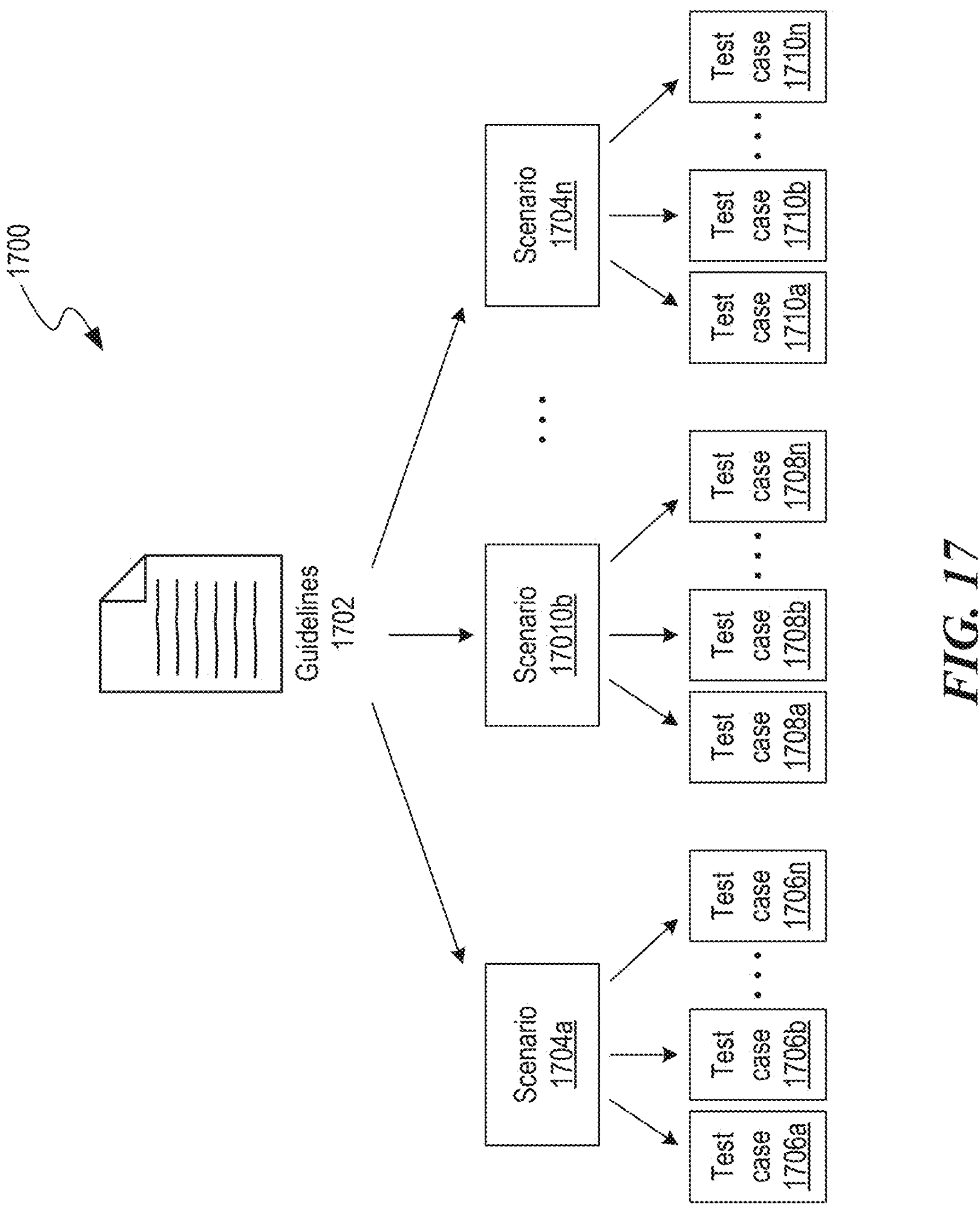
FIG. 17 is a block diagram illustrating an example environment generating test cases from the guidelines, in accordance with some implementations of the present technology.

FIG. 17 is a block diagram illustrating an example environment 1700 generating test cases from the guidelines, in accordance with some implementations of the present technology. Environment 1700 includes guidelines 1702, scenarios 1704*a-n*, and test cases 1706*a-n*, 1708*a-n*, and 1710*a-n*. Guidelines 1702 can be any of guidelines 802 illustrated and described in more detail with reference to FIG. 8. Test cases 1706*a-n*, 1708*a-n*, and 1710*a-n* can be any of test case 1004 illustrated and described in more detail with reference to FIG. 10 or validation actions 1408 in FIG. 14. Likewise, embodiments of example environment 1700 can include different and/or additional components or can be connected in different ways.

Guidelines 1702 are extracted from regulatory documents and organizational policies and stored in a vector space for efficient retrieval and processing. Documents are translated into a structured format, such as Gherkin. Gherkin is a human-readable language, so translating the guidelines into Gherkin format helps standardize the specifications'representation and makes the specifications more accessible in the compliance assessment process. The translated guidelines can be transformed and stored in the vector stores.

Guidelines 1702 is split into different scenarios 1704*a-n*, for a total of n scenarios, where each scenario 1704 represents a specific topic outlined in the guidelines. For example, regulatory documents contain provisions covering various topics such as data privacy, fairness, transparency, and accountability, each of which can be a scenario 1704. The scenarios 1704 serve as the basis for constructing test cases that encompass a range of possible inputs, outputs, and outcomes.

The system can define scenarios 1704*a-n* based on predefined rules or criteria derived from the guidelines 1702. The rules or criteria can be defined manually by users or generated automatically using machine learning techniques. The system can parse through the guidelines 1702 to extract information that matches the predefined rules or criteria. For example, if the guidelines 1702 specify certain conditions or constraints for data privacy or model fairness, the system identifies sections or passages in the guidelines 1702 that address the corresponding aspects. After identifying the relevant sections or passages of the guidelines (discussed further with reference to FIG. 10), the system groups them into distinct scenarios 1704 based on common themes or topics. Each scenario 1704 represents a specific aspect or requirement outlined in the guidelines 1702. For instance, if the guidelines 1702 cover topics such as data privacy, model transparency, and algorithmic fairness, the system creates scenarios 1704 corresponding to each of these topics.

Machine learning techniques can be applied to identify patterns or clusters within the guidelines and automatically categorize the guidelines 1702 into relevant scenarios 1704 based on similarity or relevance. Natural Language Processing (NLP) techniques can be used to identify the scenarios 1704 from the guidelines 1702. The system can use named entity recognition (NER), in some implementations, to identify specific terms, phrases, or clauses within the guidelines 1702 that pertain to different scenarios 1704. For example, NER can be used to identify mentions of "data privacy,"

"fairness," "transparency," "accountability," or other terms of interest within the guidelines 1702. By recognizing the named entities, the system can categorize the guidelines 1702 into different scenarios 1704. In some implementations, sentiment analysis can be applied to assess the tone and sentiment of the guidelines 1702 towards each scenario 1704, allowing the system to understand whether a particular provision of the guideline 1702 is framed as a requirement, recommendation, or prohibition. For example, sentiment analysis can determine whether a guideline 1702 related to data privacy imposes strict obligations on data controllers or merely provides guidelines for best practices. Syntactic parsing can be used by the system to analyze the grammatical structure within the guidelines 1702 and extract information that helps the system categorize the guidelines 1702 into scenarios 1704. For example, by parsing the syntax of regulatory provisions, the system can identify relationships between different compliance requirements in the guidelines 1702 and determine the scope and applicability of each provision.

In some implementations, clustering algorithms, such as k-means or hierarchical clustering, can be used to identify scenarios 1704 based on the guideline's 1702 content or features by partitioning the guideline 1702 into clusters, where the content within each cluster are more similar to each other than the content in different clusters. After clustering the content within guideline 1702, the system can assign each cluster to a relevant scenario 1704 based on the cluster's content or theme. For example, if a cluster predominantly discusses data privacy regulations, the cluster is assigned to a scenario 1704 related to data privacy compliance.

In some implementations, deep learning techniques (e.g., recurrent neural networks (RNNs)) are used to learn latent representations of the guideline 1702 and automatically cluster the guideline 1702 based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Within each scenario 1704, the scenario 1704 is further divided into individual test cases 1706*a-n*, for a total of n test cases, where each test case 1706 is designed to evaluate a particular aspect or requirement specified in the scenario 1704, allowing for thorough testing of AI applications against the set of criteria outlined in the guidelines. For example, if a scenario 1704 relates to data privacy regulations, individual test cases 1706 can focus on aspects such as data encryption, user consent mechanisms, or data retention policies. The test cases 1706 can include prompts, expected outcomes, and expected explanations. The prompts provide inputs to the AI application under test, while the expected outcomes specify the desired responses or actions expected from the AI application. The expected explanations articulate the rationale or reasoning behind the expected outcomes. Example expected outcomes and expected explanations of the test cases 1706 are discussed further in FIG. 10. Some guidelines 1702 may not directly translate into scenarios 1704 or test cases 1706, requiring the use of glue code or other validation techniques to bridge the gap. The glue code operates as the intermediary code or script that implements custom logic or algorithms to translate abstract guidelines into concrete test cases. For instance, if a guideline 1702 emphasizes "Ensuring fairness in algorithmic decision-making," the glue code extracts relevant features from the AI model's decision-making process, such as demographic information or historical data. The glue code assesses fairness metrics, like disparate impact or demographic parity to bridge the gap between abstract guidelines and actionable evaluations.

Figure 18:
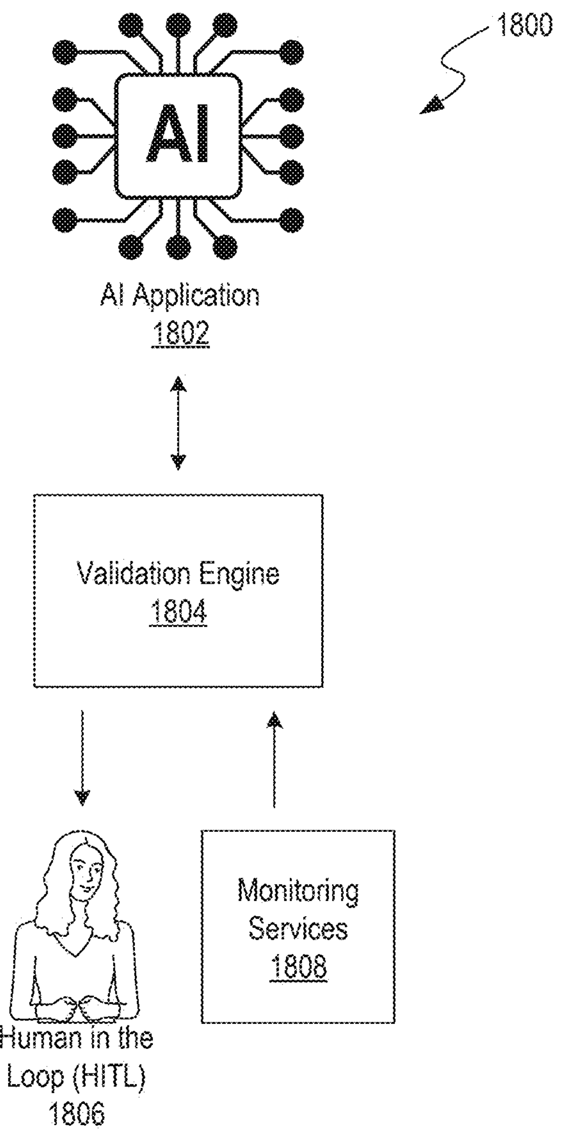
FIG. 18 is a block diagram illustrating an example environment monitoring the validation engine for determining AI compliance, in accordance with some implementations of the present technology.

FIG. 18 is a block diagram illustrating an example environment 1800 monitoring the validation engine for determining AI compliance, in accordance with some implementations of the present technology. Environment 1800 includes AI application 1802, validation engine 1804, human-in-the-loop (HITL) validation 1806, and monitoring services 1808. Validation engine 1804 is the same as or similar to validation engine 804 illustrated and described in more detail with reference to FIG. 8 and validation engine 912 in FIG. 9. Validation engine 1804 is implemented using components of example computer system 1700 illustrated and described in more detail with reference to FIG. 17. Likewise, embodiments of example environment 1800 can include different and/or additional components or can be connected in different ways.

The AI application 1802 generates outputs based on input data and internal algorithms. These outputs are fed into the validation engine 1804, which employs algorithms and validation scripts to assess the compliance of the AI model in the AI application 1802 with predefined guidelines and criteria (e.g., test cases 1706*a-n*, 1708*a-n*, and 1710*a-n* in FIG. 17). Methods of evaluating the AI application 1802's compliance with the predefined guidelines and criteria are discussed in further detail with references to FIGS. 10-18. In some implementations, to further validate the AI application 1802, the system includes HITL validation 1806, where users review the assessment results, identify any discrepancies or ambiguities, and provide feedback to improve the validation process.

HITL validation 1806 allows users to provide feedback and annotations on the validation engine's 1804 conclusions and recommendations, assessing the validation engine 1804 for accuracy, fairness, and/or ethical compliance. The user feedback helps further ensure the AI application's 1802 compliance with regulatory requirements. In some implementations, the system includes user interfaces and feedback mechanisms that allow users to review the validation engine's 1804 conclusions and recommendations. For example, the system can include dashboard interfaces for visualizing the validation engine 1804's outputs, annotation tools for highlighting potential issues, and communication channels between users for adjusting the operational parameters of the validation engine 1804.

Monitoring services 1808 are used, in some implementations, to continuously monitor the validation engine's 1804 performance and correctness. Monitoring services 1808 track the validation process in real-time, identifying any anomalies or deviations from expected behavior. If discrepancies are detected, corrective actions can be taken to adjust the validation engine's 1804 operational parameters to ensure a reliable assessment of AI compliance. Monitoring services 1808 use metrics and alerts to flag any deviations or anomalies, which can be used to determine and/or implement corrective actions. In some implementations, the system incorporates automated corrective actions that can be triggered in response to detected anomalies. The corrective actions can include adjusting the operational parameters of the validation engine 1804, such as tuning validation thresholds, updating validation scripts, or scaling resources to handle increased validation workload. In some implementations, the monitoring services 1808 uses rule-based approaches to flag deviations or anomalies based on predefined thresholds or criteria. For example, if the validation throughput drops below a certain threshold or the error rate exceeds a predefined limit, the monitoring services 1808 triggers alerts indicating potential issues.

Example Implementation of the Models of the Data Validation Platform

Figure 19:
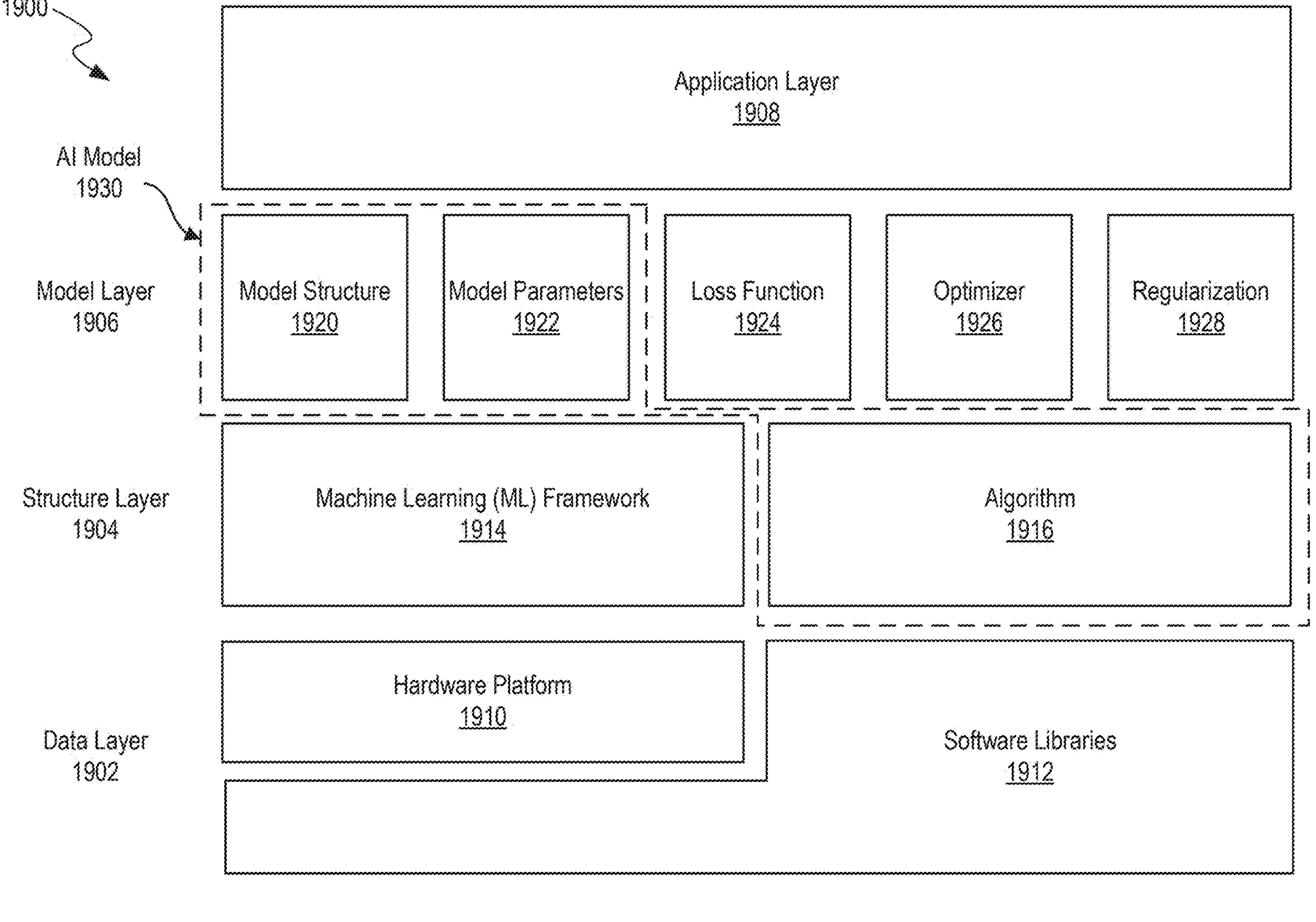
FIG. 19 illustrates a layered architecture of an artificial intelligence (AI) system that can implement the machine learning models of the data validation platform of FIG. 1, in accordance with some implementations of the present technology.

FIG. 19 illustrates a layered architecture of an AI system 1900 that can implement the ML models of the data validation platform 104 of FIG. 1, in accordance with some implementations of the present technology. Example ML models can include the models executed by the data validation platform 104, such as classifying model 110. Accordingly, the classifying model 110 can include one or more components of the AI system 1900.

As shown, the AI system 1900 can include a set of layers, which conceptually organize elements within an example network topology for the AI system's architecture to implement a particular AI model. Generally, an AI model is a computer-executable program implemented by the AI system 1900 that analyses data to make predictions. Information can pass through each layer of the AI system 1900 to generate outputs for the AI model. The layers can include a data layer 1902, a structure layer 1904, a model layer 1906, and an application layer 1908. The algorithm 1916 of the structure layer 1904 and the model structure 1920 and model parameters 1922 of the model layer 1906 together form an example AI model. The optimizer 1926, loss function engine 1924, and regularization engine 1928 work to refine and optimize the AI model, and the data layer 1902 provides resources and support for application of the AI model by the application layer 1908.

The data layer 1902 acts as the foundation of the AI system 1900 by preparing data for the AI model. As shown, the data layer 1902 can include two sub-layers: a hardware platform 1910 and one or more software libraries 1912. The hardware platform 1910 can be designed to perform operations for the AI model and include computing resources for storage, memory, logic and networking, such as the resources described in relation to FIG. 20. The hardware platform 1910 can process amounts of data using one or more servers. The servers can perform backend operations such as matrix calculations, parallel calculations, machine learning (ML) training, and the like. Examples of servers used by the hardware platform 1910 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1910 can include computing resources, (e.g., servers, memory, etc.) offered by a cloud services provider. The hardware platform 1910 can also include computer memory for storing data about the AI model, application of the AI model, and training data for the AI model. The computer memory can be a form of random-access memory (RAM), such as dynamic RAM, static RAM, and non-volatile RAM.

The software libraries 1912 can be thought of suites of data and programming code, including executables, used to control the computing resources of the hardware platform 1910. The programming code can include low-level primitives (e.g., fundamental language elements) that form the foundation of one or more low-level programming languages, such that servers of the hardware platform 1910 can use the low-level primitives to carry out specific operations. The low-level programming languages do not require much, if any, abstraction from a computing resource's instruction set architecture, enabling them to run quickly with a small memory footprint. Examples of software libraries 1912 that can be included in the AI system 1900 include INTEL Math Kernel Library, NVIDIA Cudnn, EIGEN, and OpenBLAS.

The structure layer 1904 can include an ML framework 1914 and an algorithm 1916. The ML framework 1914 can be thought of as an interface, library, or tool that enables users to build and deploy the AI model. The ML framework 1914 can include an open-source library, an API, a gradient-boosting library, an ensemble method, and/or a deep learning toolkit that work with the layers of the AI system facilitate development of the AI model. For example, the ML framework 1914 can distribute processes for application or training of the AI model across multiple resources in the hardware platform 1910. The ML framework 1914 can also include a set of pre-built components that have the functionality to implement and train the AI model and enable users to use pre-built functions and classes to construct and train the AI model. Thus, the ML framework 1914 can be used to facilitate data engineering, development, hyperparameter tuning, testing, and training for the AI model. Examples of ML frameworks 1914 that can be used in the AI system 1900 include TENSORFLOW, PYTORCH, SCIKIT-LEARN, KERAS, LightGBM, RANDOM FOREST, and AMAZON WEB SERVICES.

The algorithm 1916 can be an organized set of computer-executable operations used to generate output data from a set of input data and can be described using pseudocode. The algorithm 1916 can include complex code that enables the computing resources to learn from new input data and create new/modified outputs based on what was learned. In some implementations, the algorithm 1916 can build the AI model through being trained while running computing resources of the hardware platform 1910. This training enables the algorithm 1916 to make predictions or decisions without being explicitly programmed to do so. Once trained, the algorithm 1916 can run at the computing resources as part of the AI model to make predictions or decisions, improve computing resource performance, or perform tasks. The algorithm 1916 can be trained using supervised learning, unsupervised learning, semi-supervised learning, and/or reinforcement learning.

Using supervised learning, the algorithm 1916 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of user query 102 in FIG. 1) from various source computing systems described in relation to FIG. 1. Furthermore, training data can include pre-processed data generated by various engines of the data validation platform 104 described in relation to FIG. 1. The user may label the training data based on one or more classes and trains the AI model by inputting the training data to the algorithm 1916. The algorithm determines how to label the new data based on the labeled training data. The user can facilitate collection, labeling, and/or input via the ML framework 1914. In some instances, the user may convert the training data to a set of feature vectors for input to the algorithm 1916. Once trained, the user can test the algorithm 1916 on new data to determine if the algorithm 1916 is predicting accurate labels for the new data. For example, the user can use cross-validation methods to test the accuracy of the algorithm 1916 and retrain the algorithm 1916 on new training data if the results of the cross-validation are below an accuracy threshold.

Supervised learning can include classification and/or regression. Classification techniques include teaching the algorithm 1916 to identify a category of new observations based on training data and are used when input data for the algorithm 1916 is discrete. Said differently, when learning through classification techniques, the algorithm 1916 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1916 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 1916 is continuous. Regression techniques can be used to train the algorithm 1916 to predict or forecast relationships between variables. To train the algorithm 1916 using regression techniques, a user can select a regression method for estimating the parameters of the model. The user collects and labels training data that is input to the algorithm 1916 such that the algorithm 1916 is trained to understand the relationship between data features and the dependent variable(s). Once trained, the algorithm 1916 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1916 learns patterns from unlabeled training data. In particular, the algorithm 1916 is trained to learn hidden patterns and insights of input data, which can be used for data exploration or for generating new data. Here, the algorithm 1916 does not have a predefined output, unlike the labels output when the algorithm 1916 is trained using supervised learning. Said another way, unsupervised learning is used to train the algorithm 1916 to find an underlying structure of a set of data, group the data according to similarities, and represent that set of data in a compressed format. The data validation platform 104 can use unsupervised learning to identify patterns in claim history (e.g., to identify particular event sequences) and so forth. In some implementations, performance of the classifying model 110 that can use unsupervised learning is improved because the incoming user query 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1916 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1916 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1916 include factor analysis, item response theory, latent profile analysis, and latent class analysis.

The model layer 1906 implements the AI model using data from the data layer and the algorithm 1916 and ML framework 1914 from the structure layer 1904, thus enabling decision-making capabilities of the AI system 1900. The model layer 1906 includes a model structure 1920, model parameters 1922, a loss function engine 1924, an optimizer 1926, and a regularization engine 1928.

The model structure 1920 describes the architecture of the AI model of the AI system 1900. The model structure 1920 defines the complexity of the pattern/relationship that the AI model expresses. Examples of structures that can be used as the model structure 1920 include decision trees, support vector machines, regression analyses, Bayesian networks, Gaussian processes, genetic algorithms, and artificial neural networks (or, simply, neural networks). The model structure 1920 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1920 may include one or more hidden layers of nodes between the input and output layers. The model structure 1920 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1922 represent the relationships learned during training and can be used to make predictions and decisions based on input data. The model parameters 1922 can weight and bias the nodes and connections of the model structure 1920. For instance, when the model structure 1920 is a neural network, the model parameters 1922 can weight and bias the nodes in each layer of the neural networks, such that the weights determine the strength of the nodes and the biases determine the thresholds for the activation functions of each node. The model parameters 1922, in conjunction with the activation functions of the nodes, determine how input data is transformed into desired outputs. The model parameters 1922 can be determined and/or altered during training of the algorithm 1916.

The loss function engine 1924 can determine a loss function, which is a metric used to evaluate the AI model's performance during training. For instance, the loss function engine 1924 can measure the difference between a predicted output of the AI model and the actual output of the AI model and is used to guide optimization of the AI model during training to minimize the loss function. The loss function may be presented via the ML framework 1914, such that a user can determine whether to retrain or otherwise alter the algorithm 1916 if the loss function is over a threshold. In some instances, the algorithm 1916 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1926 adjusts the model parameters 1922 to minimize the loss function during training of the algorithm 1916. In other words, the optimizer 1926 uses the loss function generated by the loss function engine 1924 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1926 used may be determined based on the type of model structure 1920 and the size of data and the computing resources available in the data layer 1902.

The regularization engine 1928 executes regularization operations. Regularization is a technique that prevents over- and under-fitting of the AI model. Overfitting occurs when the algorithm 1916 is overly complex and too adapted to the training data, which can result in poor performance of the AI model. Underfitting occurs when the algorithm 1916 is unable to recognize even basic patterns from the training data such that it cannot perform well on training data or on validation data. The optimizer 1926 can apply one or more regularization techniques to fit the algorithm 1916 to the training data properly, which helps constraint the resulting AI model and improves its ability for generalized application. Examples of regularization techniques include lasso (L1) regularization, ridge (L2) regularization, and elastic (L1 and L2 regularization).

The application layer 1908 describes how the AI system 1900 is used to solve problem or perform tasks. In an example implementation, the application layer 1908 can include a front-end user interface of the data validation platform 104.

Example Computing Environment of the Data Validation Platform

Figure 20:
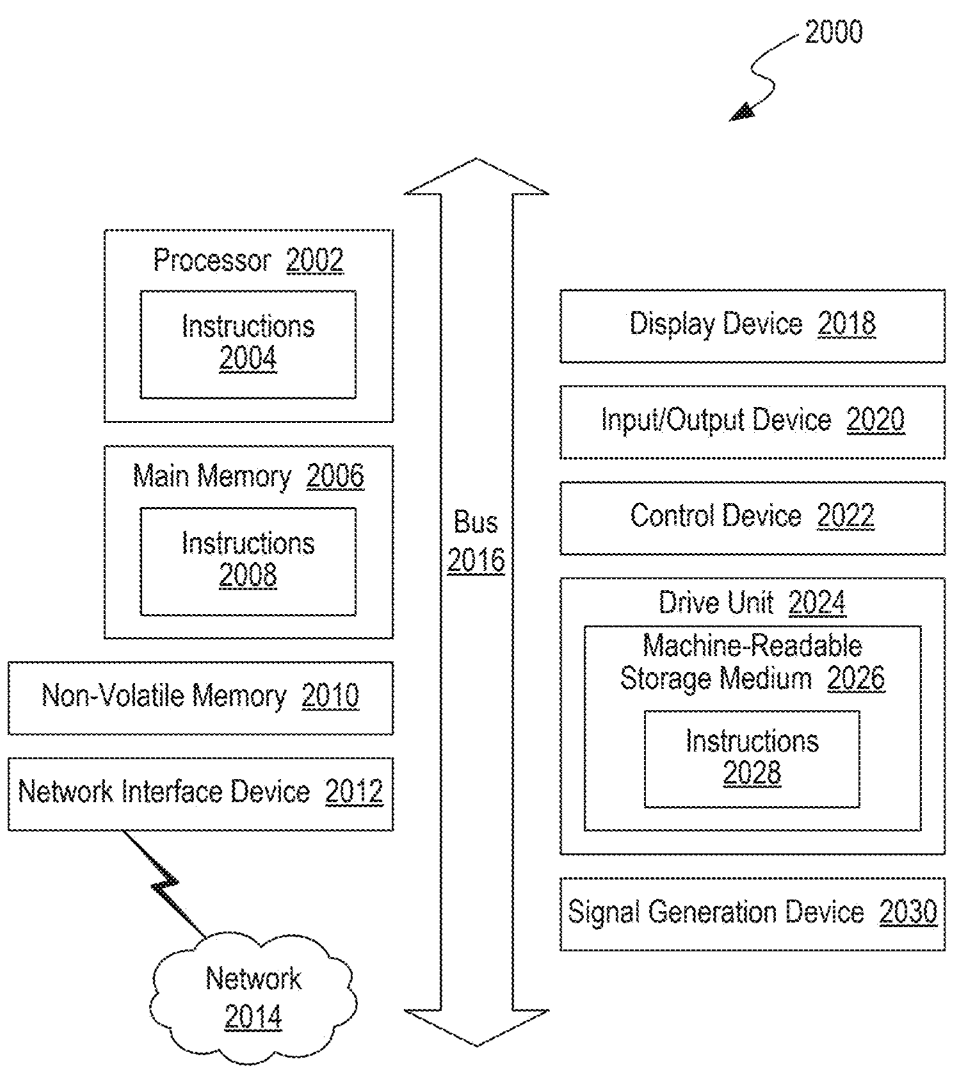
FIG. 20 is a block diagram showing some of the components typically incorporated in at least some of the computer systems and other devices on which the data validation platform operates in accordance with some implementations of the present technology.

FIG. 20 is a block diagram showing some of the components typically incorporated in at least some of the computer systems and other devices 2000 on which the disclosed system operates in accordance with some implementations of the present technology. As shown, an example computer system 2000 can include: one or more processors 2002, main memory 2008, non-volatile memory 2012, a network interface device 2014, video display device 2020, an input/output device 2022, a control device 2024 (e.g., keyboard and pointing device), a drive unit 2026 that includes a machine-readable medium 2028, and a signal generation device 2032 that are communicatively connected to a bus 2018. The bus 2018 represents one or more physical buses and/or point-to-point connections that are connected by appropriate bridges, adapters, or controllers. Various common components (e.g., cache memory) are omitted from FIG. 20 for brevity. Instead, the computer system 2000 is intended to illustrate a hardware device on which components illustrated or described relative to the examples of the figures and any other components described in this specification can be implemented.

The computer system 2000 can take any suitable physical form. For example, the computer system 2000 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 2000. In some implementations, the computer system 2000 can be an embedded computer system, a system-on-chip (SOC), a single-board computer system (SBC) or a distributed system such as a mesh of computer systems or include one or more cloud components in one or more networks. Where appropriate, one or more computer systems 2000 can perform operations in real-time, near real-time, or in batch mode.

The network interface device 2014 enables the computer system 2000 to exchange data in a network 2016 with an entity that is external to the computing system 2000 through any communication protocol supported by the computer system 2000 and the external entity. Examples of the network interface device 2014 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 2008, non-volatile memory 2012, machine-readable medium 2028) can be local, remote, or distributed. Although shown as a single medium, the machine-readable medium 2028 can include multiple media (e.g., a centralized/distributed database and/or associated caches and servers) that store one or more sets of instructions 2030. The machine-readable (storage) medium 2028 can include any medium that is capable of storing, encoding, or carrying a set of instructions for execution by the computer system 2000. The machine-readable medium 2028 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2010, 2030) set at various times in various memory and storage devices in computing device(s). When read and executed by the processor 2002, the instruction(s) cause the computer system 2000 to perform operations to execute elements involving the various aspects of the disclosure.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S. C. § 112(f) will begin with the words "means for," but use of the term "for" in any other context is not intended to invoke treatment under 35 U.S. C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A computer-implemented method for generating responses using data retrieved in accordance with chunk-level access controls, the method comprising:

receiving, via a user interface of a computing device, an output generation request including (1) an input including instructions to generate an output responsive to the input and (2) an access control metadata set indicative of a degree of access to a document set within a vector database for a user associated with the output generation request, wherein each portion of the document set includes a data chunk set comprising one or more of: text data, audio data, image data, or video data, wherein each data chunk represents a subset of a document;

determining a vector representation set of one or more data chunk sets that are associated with generating the output by comparing (1) a vector representation of the received input with (2) corresponding vector representations of each data chunk of the document set;

filtering, using one or more first AI models, the data chunk set to generate a data chunk subset by:

transmitting, using the one or more first AI models, a query to the vector database, wherein the query includes (1) the vector representation set of one or more data chunk sets and (2) the access control metadata set, and receiving, from the vector database, the data chunk subset by determining a permission indicator for each data chunk of the document set that defines a corresponding degree of access to the data chunk for the user in accordance with the access control metadata set;

generating, using one or more second AI models, a response that is responsive to the input of the output generation request by:

transmitting the data chunk subset to one or more input nodes of the one or more second AI models, and receiving, from one or more output nodes of the one or more second AI models, the response; and responsive to generating the response, displaying a graphical layout on the user interface of the computing device that includes (1) a first graphical representation indicative of the input within the output generation request and (2) a second graphical representation indicative of the response.

2. The computer-implemented method of claim 1, wherein the access control metadata set includes one or more of: (1) a user-specific permission or (2) a role-based access control rule corresponding to the user for accessing portions of the document set.

3. The computer-implemented method of claim 1, further comprising:

determining a degree of similarity between (1) the vector representation of the received input with (2) corresponding vector representations of each data chunk of the document set; and comparing the degree of similarity to a predefined threshold.

4. The computer-implemented method of claim 1, wherein the graphical layout further includes one or more of: (1) a third graphical representation indicating the data chunk subset used to generate the response, or (2) a fourth graphical representation indicating the access control metadata set.

5. The computer-implemented method of claim 1, further comprising:

identifying an assigned role set of a user within a hierarchal data structure; and traversing the hierarchal data structure to identify the permission indicator for each data chunk of the document set.

6. The computer-implemented method of claim 1, wherein the one or more first AI models and the one or more second AI models are the same model.

7. The computer-implemented method of claim 1, wherein the one or more first AI models and the one or more second AI models set are different models.

8. A system comprising:

at least one hardware processor; and at least one non-transitory memory storing instructions, which, when executed by the at least one hardware processor, cause the system to:

obtain, via a user interface of a computing device, an output generation request including (1) an input including instructions to generate an output responsive to the input and (2) an access control metadata set indicative of a degree of access to a content item set within a vector database for a user associated with the output generation request, wherein each subset of each content item includes a data chunk set comprising one or more of: text data, audio data, image data, or video data;

determine a vector representation set of one or more data chunk sets that are associated with generating the output by comparing (1) a vector representation of the obtained input with (2) corresponding vector representations of each data chunk of the content item set;

filter, using one or more first artificial intelligence (AI) models, the data chunk set to generate a data chunk subset in accordance with the access control metadata set;

generate, using one or more second AI models, a response that is responsive to the input of the output generation request in accordance with the data chunk subset; and responsive to generating the response, display a graphical layout on the user interface of the computing device that includes (1) a first graphical representation indicative of the input within the output generation request and (2) a second graphical representation indicative of the response.

9. The system of claim 8, wherein the access control metadata set includes one or more of: (1) a user-specific permission or (2) a role-based access control rule corresponding to the user for accessing portions of the content item set.

10. The system of claim 8, wherein the system is further caused to:

determining a degree of similarity between (1) the vector representation of the obtained input with (2) corresponding vector representations of each data chunk of the content item set; and comparing the degree of similarity to a predefined threshold.

11. The system of claim 8, wherein the graphical layout further includes one or more of: (1) a third graphical representation indicating the data chunk subset used to generate the response, or (2) a fourth graphical representation indicating the access control metadata set.

12. The system of claim 8, wherein the system is further caused to:

identifying an assigned role set of a user within a hierarchal data structure; and traversing the hierarchal data structure to identify a permission indicator for each data chunk of the content item set.

13. The system of claim 8, wherein the one or more first AI models and the one or more second AI models are the same model.

14. One or more non-transitory, computer-readable storage media comprising instructions thereon, wherein the instructions, when executed by at least one data processor of a system, cause the system to:

obtain, via a computing device, an output generation request including (1) an input including instructions to generate an output responsive to the input and (2) an access control metadata set indicative of a degree of access to a content item set within a vector database for a user associated with the output generation request;

determine a vector representation set of one or more data chunk sets that are associated with generating the output by comparing (1) a vector representation of the obtained input with (2) corresponding vector representations of one or more data chunks of the content item set, wherein each data chunk represents a section of a content item within the content item set;

filter, using one or more first artificial intelligence (AI) models, the data chunk set to generate a data chunk subset in accordance with the access control metadata set;

generate, using one or more second AI models, a response that is responsive to the input of the output generation request in accordance with the data chunk subset; and responsive to generating the response, display a graphical layout on the computing device that includes one or more of: (1) a first graphical representation indicative of the input within the output generation request or (2) a second graphical representation indicative of the response.

15. The one or more non-transitory, computer-readable storage media of claim 14, wherein the access control metadata set includes one or more of: (1) a user-specific permission or (2) a role-based access control rule corresponding to the user for accessing portions of the content item set.

16. The one or more non-transitory, computer-readable storage media of claim 14, wherein the instructions further cause the system to:

determining a degree of similarity between (1) a vector representation of the obtained input with (2) corresponding vector representations of each data chunk of the content item set; and comparing the degree of similarity to a predefined threshold.

17. The one or more non-transitory, computer-readable storage media of claim 14, wherein the graphical layout further includes one or more of: (1) a third graphical representation indicating the data chunk subset used to generate the response, or (2) a fourth graphical representation indicating the access control metadata set.

18. The one or more non-transitory, computer-readable storage media of claim 14, wherein the instructions further cause the system to:

identifying an assigned role set of a user within a hierarchal data structure; and traversing the hierarchal data structure to identify a permission indicator for each data chunk of the content item set.

19. The one or more non-transitory, computer-readable storage media of claim 14, wherein the one or more first AI models and the one or more second AI models are the same model.

20. The one or more non-transitory, computer-readable storage media of claim 14, wherein the one or more first AI models and the one or more second AI models are different models.

* * * * *